(12) United States Patent
Kanai

(10) Patent No.: US 7,324,146 B2
(45) Date of Patent: Jan. 29, 2008

(54) IMAGE PROCESSING DEVICE, IMAGE PROCESSING METHOD AND SOLID-STATE IMAGE-PICKUP DEVICE

(75) Inventor: Masahiro Kanai, Suwa (JP)

(73) Assignee: Seiko Epson Corporation (JP)

( * ) Notice: Subject to any disclaimer, the term of this patent is extended or adjusted under 35 U.S.C. 154(b) by 902 days.

(21) Appl. No.: 10/763,126

(22) Filed: Jan. 22, 2004

(65) Prior Publication Data

US 2004/0188640 A1    Sep. 30, 2004

(30) Foreign Application Priority Data

Jan. 22, 2003    (JP)    ............................. 2003-013604

(51) Int. Cl.
*H04N 3/14*    (2006.01)
*H04N 5/335*    (2006.01)
*H01L 27/00*    (2006.01)

(52) U.S. Cl. .................. 348/304; 348/305; 348/308; 250/208.1

(58) Field of Classification Search ............... 348/302, 348/304, 305, 308; 250/559.04, 208.1
See application file for complete search history.

(56) References Cited

U.S. PATENT DOCUMENTS

| | | |
|---|---|---|
| 4,335,405 A | 6/1982 | Sakane |
| 4,589,024 A | 5/1986 | Koch |
| 5,576,762 A | 11/1996 | Udagawa |
| 5,894,325 A | 4/1999 | Yonemoto |
| 6,051,857 A | 4/2000 | Miida |
| 7,057,655 B1 | 6/2006 | Masuyama |

FOREIGN PATENT DOCUMENTS

| | | |
|---|---|---|
| JP | 55-145481 | 11/1980 |
| JP | 58-070689 | 4/1983 |
| JP | 62-290278 | 12/1987 |
| JP | 63-031280 | 2/1988 |
| JP | 63-112899 | 5/1988 |
| JP | 63-278474 | 11/1988 |

(Continued)

OTHER PUBLICATIONS

Communication from Japanese Patent Office regarding counterpart application, Jul. 20, 2006.

(Continued)

*Primary Examiner*—Ngoc-Yen Vu
*Assistant Examiner*—Chia-Wei A Chen
(74) *Attorney, Agent, or Firm*—Harness, Dickey & Pierce, P.L.C.

(57) ABSTRACT

An image processing device and method are provided. In a method of reading an image signal from a solid-state image-pickup element where a plurality of unit pixels including a transistor for detecting a light signal and a photo diode are arranged in a matrix, shift data applied to a line for reading out an image signal, which outputs a signal for selecting a line for reading out an image signal, is output to a shift register connected to a line for reading out an image signal, when the number of lines between line for reading out an image signal and line for clearing an image signal are equal to or less than the number of lines in the matrix and the condition for picking an image up is changed.

6 Claims, 17 Drawing Sheets

FOREIGN PATENT DOCUMENTS

| | | |
|---|---|---|
| JP | 64-044178 | 2/1989 |
| JP | 02-246585 | 10/1990 |
| JP | 04-172880 | 6/1992 |
| JP | 08-336076 | 12/1996 |
| JP | 09-116804 | 5/1997 |
| JP | 63-037782 | 2/1998 |
| JP | 11-195778 | 7/1999 |
| JP | 2000-125203 | 4/2000 |
| JP | 2000-324398 | 11/2000 |
| JP | 2001-008109 | 1/2001 |
| JP | 2001-008113 | 1/2001 |
| JP | 2001-189909 | 7/2001 |
| JP | 2002-344894 | 11/2002 |

OTHER PUBLICATIONS

U.S. Appl. No. 10/763,120, filed Jan. 22, 2004, Nasu.
U.S. Appl. No. 10/763,121, filed Jan. 22, 2004, Nasu.
U.S. Appl. No. 10/763,119, filed Jan. 22, 2004, Nasu.
U.S. Appl. No. 10/763,122, filed Jan. 22, 2004, Kanai.

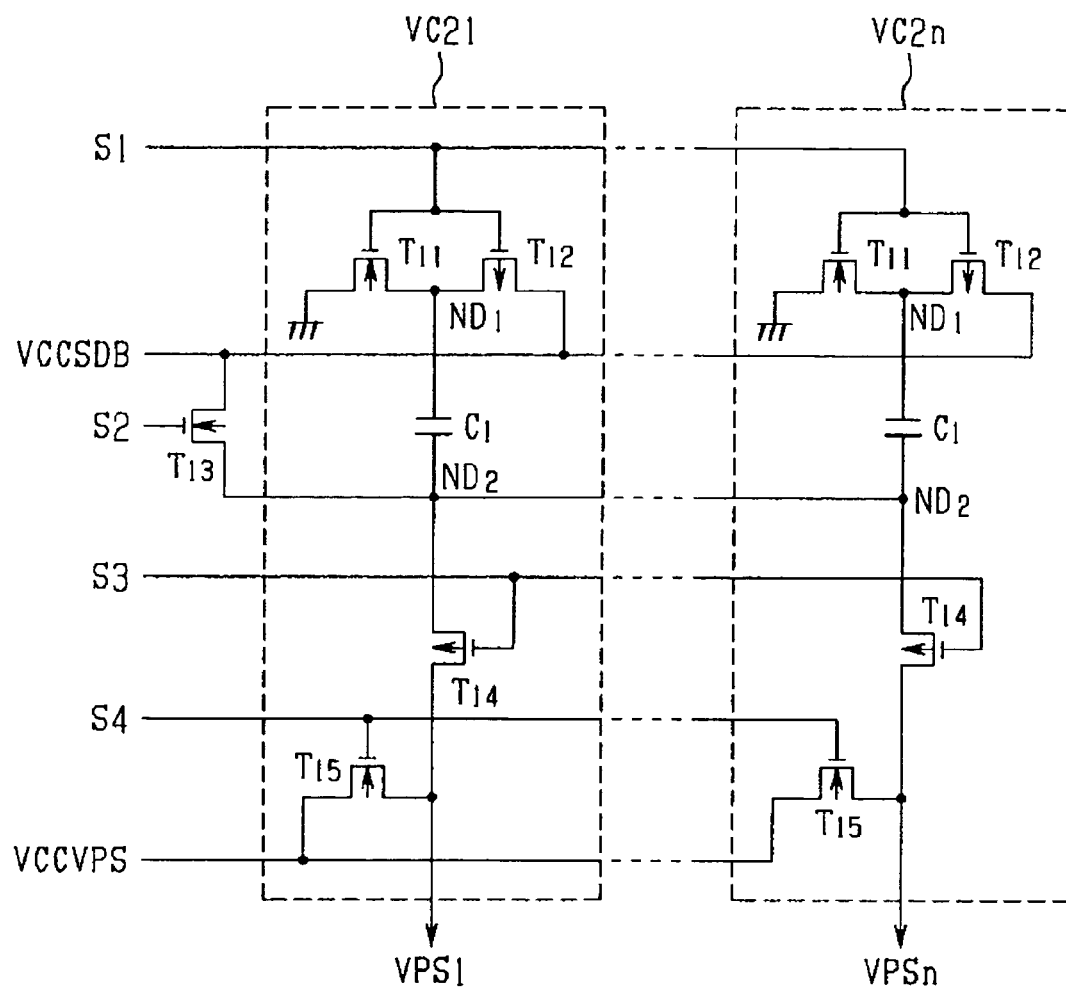
FIG. 4A
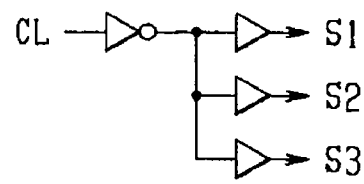
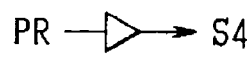
FIG. 4B

States of sensor bias

| | state | accumulation | RESS | LOADS | PR | CL | RESN | LOADN |
|---|---|---|---|---|---|---|---|---|
| GATE | selected | VCCSGHI | Lo | VCCSGHR | VCCSGHR | VCCSGHR+VCCSDB×2 | Lo | VCCSGHR |
| GATE | non selected | | Lo | Lo | Lo | Lo | Lo | Lo |
| SOURCE | selected | turning "on" (VCCSD1) | VMPR | VCCSGHR-VthS | VCCVPS | VCCSDB×2 | VMPR | VCCSGHR-VthN |
| SOURCE | non selected | VCCSDI | HiZ | VCCSDR | turning "on" (VCCVPS) | turning "on" (VCCSDB×2) | HiZ | VCCSDR |
| DRAIN | selected | | HiZ | VCCSDR | VCCVPS | VCCSDR | HiZ | VCCSDR |
| DRAIN | non selected | | HiZ | VCCSDR | VCCVPS | VCCSDR | HiZ | VCCSDR |

FIG. 5

IMAGE PROCESSING DEVICE, IMAGE PROCESSING METHOD AND SOLID-STATE IMAGE-PICKUP DEVICE

RELATED APPLICATIONS

The entire disclosure of Japanese Patent Application No. 2003-013604 filed on Jan. 22, 2003, is hereby incorporated by reference in its entirety.

BACKGROUND OF THE INVENTION

1. Technical Field of the Invention

The present invention relates to an image processing device, an image processing method and a solid-state image-pickup device. In particular, the invention relates to an image processing device that reads an image signal from a matrix type solid-state image-pickup element and an image processing method and a solid-state image-pickup device thereof.

2. Description of the Related Art

A semiconductor image sensor is used for various kinds of image input devices. Recently, of such semiconductor image sensors, a MOS solid-state image-pickup device with a threshold voltage modulation system attracts attention since it provides high image quality attained by a CCD (charged coupled device) with low power consumption by a CMOS and restrains deterioration of an image quality and realizes high density and low cost.

Technology of a MOS solid-state image-pickup device with a threshold voltage modulation system is disclosed in the Japanese Patent Publication Laid-Open No. 11-195778 for example. In a MOS solid-state image-pickup device with a threshold voltage modulation system, three states such as initialization, accumulation and reading out are repeated such that an image signal based on charges for emitting light that are accumulated in a carrier pocket of each pixel can be pulled out. An initialization period is a period of discharging residual charges from a carrier pocket. An accumulation period is a period of accumulating charges in a sensor cell. A reading out period is a period of reading a volume of charge out with voltage modulation.

However, the above Japanese Patent Publication Laid-Open No. 11-195778 does not disclose the control of a line for reading out an image signal or line for clearing an image signal to attain an appropriate image output certainly without delay when conditions for picking an image up such as change of a shutter speed and others are changed.

SUMMARY

Therefore, the present invention is intended to provide an image processing device to attain an appropriate image output certainly without delay, an image processing method and a solid-state image-pickup device.

An image processing device of the present invention that reads an image signal from an solid-state image-pickup element where a plurality of unit pixels including a transistor for detecting a light signal and a photo diode are arranged in a matrix includes a first shift register connected to a line for reading out an image signal that selects a line where a signal in response to carriers accumulated in an accumulation state for generating carriers in the photo diode in response to received light is read out, regarding each line of the matrix, and a second shift register connected to a line for clearing an image signal that selects a line for clearing an image signal where the residual carriers in the solid-state image-pickup element are discharged from the solid-state image-pickup element. Furthermore, this device includes an output circuit that outputs shift data applied to a line for reading out an image signal based on which a selection signal for selecting a line for reading out an image signal is output, to the first shift register, in the state when the number of lines between the line for reading out an image signal and the line for clearing an image signal is equal to or less than the number of lines in the matrix and the condition for picking an image up is changed. Furthermore, the out put circuit inhibits the output of the shift data to the first shift register, in the state when the number of lines between the line for reading out an image signal and the line for clearing an image signal is more than the number of lines in the matrix and the condition for picking an image up is changed.

An image processing method of the present invention that reads an image signal from a solid-state image-pickup element where a plurality of unit pixels including a transistor for detecting a light signal and a photo diode are arranged in a matrix includes the steps of forming a first shift register connected to a line for reading out an image signal that selects a line where a signal in response to carriers accumulated in an accumulation state for generating carriers in the photo diode in response to received light is read out, regarding each lines of the matrix and forming a second shift register connected to a line for clearing an image signal that selects a line for clearing an image signal where the residual carriers in the solid-state image-pickup element are discharged from the solid-state image-pickup element. The method further includes the steps of outputting shift data applied to a line for reading out an image signal, based on which a selection signal for selecting a line for reading out an image signal is output, to the first shift register, in the state when the number of lines between the line for reading out an image signal and the line for clearing an image signal is equal to or less than the number of lines in the matrix and the condition for picking an image up is changed and inhibiting the output of the shift data to the first shift register, in the state when the number of lines between the line for reading out an image signal and the line for clearing an image signal is more than the number of lines in the matrix and the condition for picking an image up is changed.

A solid-state image-pickup device of the present invention includes a solid-state image-pickup element where a plurality of unit pixels including a transistor for detecting a light signal and a photo diode are arranged in a matrix, a first shift register connected to a line for reading out an image signal that selects a line where a signal in response to carriers accumulated in an accumulation state for generating carriers in the photo diode in response to received light is read out, regarding each lines of the matrix, and a second shift register connected to a line for clearing an image signal that selects a line for clearing an image signal where the residual carriers in the solid-state image-pickup element are discharged from the solid-state image-pickup element. The device further includes an output circuit that outputs shift data applied to a line for reading out an image signal, based on which a selection signal for selecting a line for reading out an image signal is output, to the first shift register, in the state when the number of lines between the line for reading out an image signal and the line for clearing an image signal is equal to or less than the number of lines in the matrix and the condition for picking an image up is changed. Furthermore, the output circuit inhibits the output of the shift data to the first shift register, in the state when the number of lines between the line for reading out an image signal and the line for clearing an image signal is more than the number of lines in the matrix and the condition for picking an image up is changed.

According to this structure, the appropriate image output can be obtained certainly without delay.

In addition, the image processing device of the present invention may further includes another output circuit that outputs a reset signal to the second shift register.

According to this structure, a plurality of signals for selecting a line for clearing an image signal do not exist during the next cycle such that there is no any parts in an image of which image qualities are different each other.

In addition, in the image processing device of the present invention, the condition for picking an image up may be any of conditions of a frame rate, a shutter speed and a scanning direction.

According to this structure, an appropriate image can be obtained, even if any of the frame rate, the shutter speed and the scanning direction is changed in particular.

In addition, in the image processing device of the present invention, the output circuit may output the selection signal in the case of generating an interlacing frame according to the frame rate.

Furthermore, according to this structure, an appropriate image can be obtained, even if the frame rate is lowered.

BRIEF DESCRIPTION OF THE DRAWINGS

FIGS. 4A and B are circuit diagrams showing a structure of a source voltage supply circuit related to the preferred embodiment of the present invention.

FIG. 5 is a diagram explaining a bias voltage applied to a sensor cell related to the preferred embodiment of the present invention.

DETAILED DESCRIPTION

Figure 1:
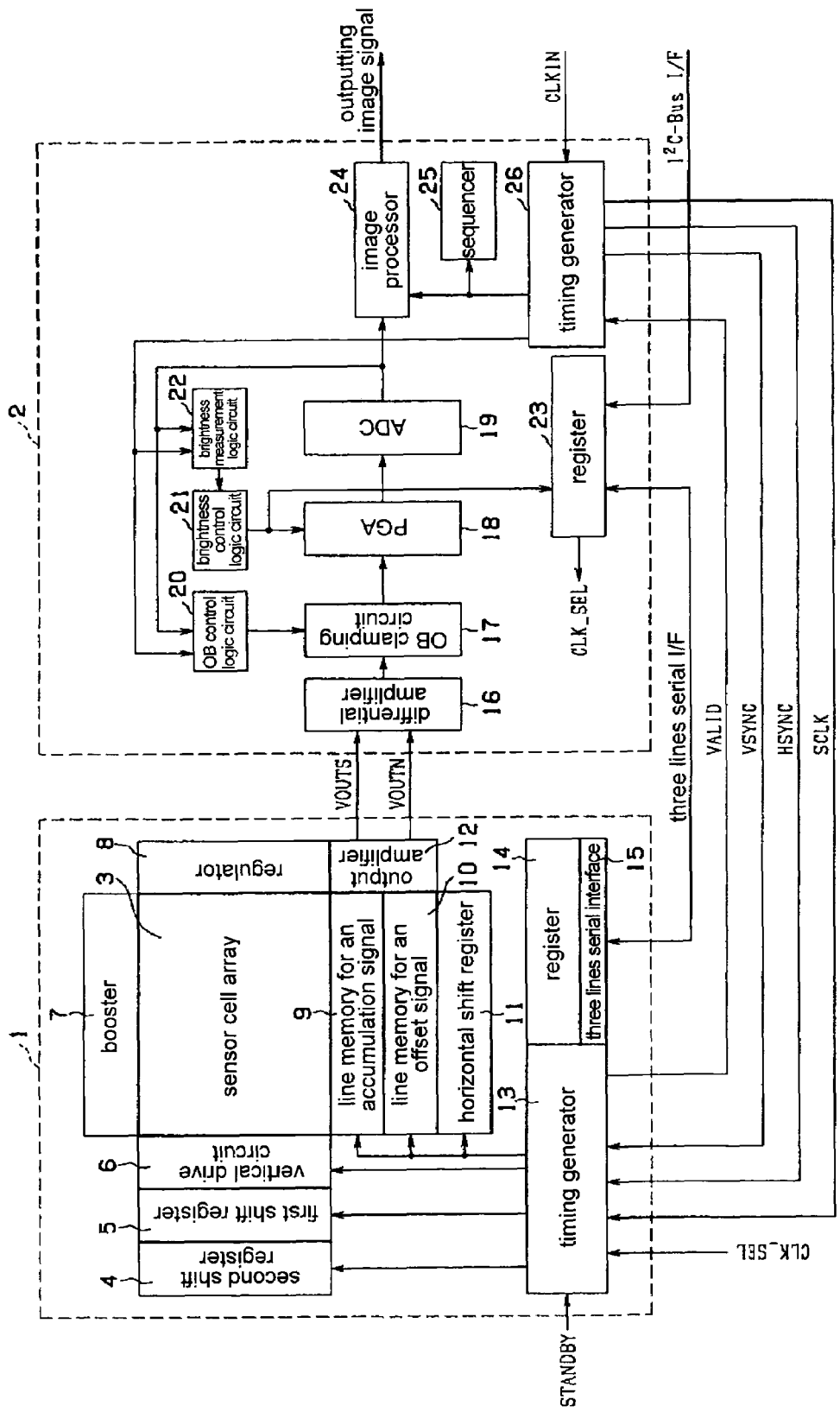
FIG. 1 is a block diagram showing a structure of an image processing device related to the preferred embodiment of the present invention.

The preferred embodiments of the present invention are explained in detail referring to the drawings.

At first, an overall structure of an image processing device related to the present embodiments is explained referring to FIG. 1.

FIG. 1 shows a block diagram of the image processing device including an image sensor LSI (large scale integrated circuit) 1 as a solid-state image-pickup device and a signal processor LSI 2 as a signal processing device. The image sensor LSI 1 is a two-dimensional solid-state image-pickup device that converts an optical image to an electrical signal and applies this pixel signal based on the optical image to the signal processor LSI 2. The signal processor LSI 2 executes a predetermined signal processing to each of received pixel signals and outputs an image signal.

The image sensor LSI 1 includes a sensor cell array 3, a second shift register 4, a first shift register 5 and a vertical drive circuit 6 and a booster 7, a regulator 8, a line memory 9 for an accumulated signal, a line memory 10 for an offset signal, a horizontal shift register 11, an output amplifier 12 and a timing generator 13. The timing generator 13 includes a register 14 and a three line serial interface 15. The second shift register 4 is connected to a line for clearing an image signal and the first shift register 5 is connected to a line for reading out an image signal.

For example, the sensor cell array 3 in the image sensor LSI 1 is a solid-state image pickup device with the threshold modulation system disclosed in the Japanese Patent Publication Laid-Open No. 11-195778. Various control signals are applied to various circuits from the timing generator 13. Based on these control signals, the sensor cell array 3 outputs pixel signals according to an amount of light that each cell receives. In addition, for example, the sensor cell array 3 includes cells of 640×480 and a region for optical black (OB or an OB region). When it includes cells and the OB region, the sensor cell array 3 comprises cells of 712×500, for example. Further, the image sensor LSI 1 applies two output signals such as an analog output signal VOUTS, which is a signal component in response to an amount of received light, and an analog output signal VOUTN in response to an offset component, to the signal-processing LSI 2.

The vertical drive circuit 6 is a circuit for selecting a line for reading out an image signal and a line for clearing an image signal. The first shift register 5 and the second shift register 4 are circuits that designate a line for reading out an image signal and a line for clearing an image signal respectively.

The regulator 8 is a voltage production circuit for producing various voltages applied to components in the image sensor LSI 1. The booster 7 is a circuit that boosts voltages applied from the regulator 8 in order to apply necessary voltages to the sensor cell array 3 described below. In addition, the image sensor LSI 1 will be explained in detail referring to FIG. 2.

The signal processor LSI 2 includes a differential amplifier 16, an optical black (abbreviated with OB hereafter) clamping circuit 17 and a programmable gain amplifier (PGA) 18 and an analog to digital conversion circuit (ADC)

19, an OB control logic circuit 20, a brightness control logic circuit 21, a brightness measurement logic circuit 22, a register 23, an image processor 24, a sequencer 25 and a timing generator 26. The register 23 stores data such as shutter speed data and others.

Two analog signals such as the voltage output signals VOUTS and VOUTN from the image sensor LSI 1 are input into the differential amplifier 16. The differential amplifier 16 of the signal processor LSI 2 takes difference between a voltage value of the signal component and a voltage value of the offset component, amplifies and outputs such difference to the OB clamping circuit 17.

The OB clamping circuit 17 is a circuit that sets a black level of an input pixel signal to an appropriate black level. A cell including predetermined several numbers of pixels within the sensor cell array 3, namely an OB area, is shielded by a light shield and others. Based on the signal level from the shielded cell, an appropriate black level can be arranged with respect to pixel signals in a valid pixel region.

The PGA 18 is an amplifier that adjusts a gain by 1 db. unit, for example. A signal amplified by the PGA 18 is applied to the ADC 19. The ADC 19 converts the output of the PGA 18 to a digital signal. Data regarding the brightness of pixels located in the OB region is applied to the OB control logic circuit 20 as a digital signal from the ADC 19. The OB control logic circuit 20 receives a signal from the ADC 19 based on a control signal from the timing generator 26 and outputs a control signal to the OB clamping circuit 17 in order to adjust a black level.

Similarly, the brightness measurement logic circuit 22 measures the brightness based on all data of green (G) pixels within one frame supplied from the ADC 19, for example and applies the brightness data to the brightness control logic circuit 21.

The brightness control logic circuit 21 applies a gain control signal to the PGA 18 so as to adjust the brightness of an image based on the brightness data applied from the brightness measurement logic circuit 22. Furthermore, the brightness control logic circuit 21 writes data of a shutter speed in the register 23.

In addition, the register 14 and the register 23 store the same data as each other. Thus, if the content in one of these registers is changed, the content in another of these registers is also changed via the three line serial interface 15. Therefore, when the data of a shutter speed is written in the register 23 of the signal processor LSI 2, such data is further transferred and written in the register 14 of the image sensor LSI1 via the three line serial interface 15. In the image sensor LSI 1, the focal plane shutter is set based on the data of a shutter speed. The function of the focal plane shutter is described below.

The image sensor LSI 1 controls the width d1 between a line for reading out an image signal and a line for clearing an image signal of the focal plane based on the data of a shutter speed, for example. When an image is bright and exposure time is shortened, it controls the narrowing of the width d1, namely decreasing the number of lines between a line for reading out an image signal and a line for clearing an image signal. In addition, when an image is dark and exposure time is lengthened, it controls the broadening of the width d1, namely increasing number of lines between a line for reading out an image signal and a line for clearing an image signal. Furthermore, when exposure is not great enough only by controlling a shutter speed, the brightness control logic circuit 21 controls the signal gain so as to adjust appropriate signal amounts.

A system clock signal CLKIN is applied to the signal processor LSI 2. The timing generator 26 in it produces various timing signals based on the system clock signal CLKIN. The signal processor LSI 2 applies various kinds of synchronizing signals among various kinds of timing signals to the image sensor LSI 1. As a synchronizing signal, there are a sensor drive clock signal SCLK, a vertical synchronizing signal VSYNC and a horizontal synchronizing signal HSYNC. The image sensor LSI 1 applies an image signal to the signal processor LSI 2 in sync with these synchronizing signals. Therefore, each of these signals SCLK, VSYNC, and HSYNC depends upon the system clock signal CLKIN.

Various kinds of parameters such as a parameter for brightening the whole or a part of an image and others, for example, are input and stored in the register 23 of the signal processor LSI 2 via I$^2$C-Bus (I square C bus) I/F.

In the signal processor LSI 2, the image processor 24 is a circuit that produces an image based on RGB signals and the sequencer 25 is a circuit that drives the image processor 24.

Furthermore, a clock designating signal CLK_SEL is applied to the timing generator 13 of the image sensor LSI 1. The signal CLK_SEL expressly informs the image sensor LSI 1 of the designation of clock frequency for operating the image sensor LSI 1. Namely, this is to input a control signal that indicates high and low clock frequencies to the image sensor LSI 1. Based on the signal CLK_SEL, the timing generator 13 changes output timing for various kinds of control signals. Furthermore, a standby signal STANDBY is input into the timing generator 13.

Data such as a shutter speed, setting voltage for a regulator, designation of the scanning direction and others are input and stored in the register 14 of the image sensor LSI 1 via the three line serial interface 15.

In addition, the image sensor LSI 1 applies a valid signal VALID as a control signal to the timing generator 26 of the signal processor LSI 2. The valid signal VALID shows that valid image data is output from the image sensor LSI 1. When this signal is activated, valid image data is output from the image sensor LSI 1 such that the signal processor LSI 2 acknowledges that the data can be used for measuring the brightness and others.

Figure 2:
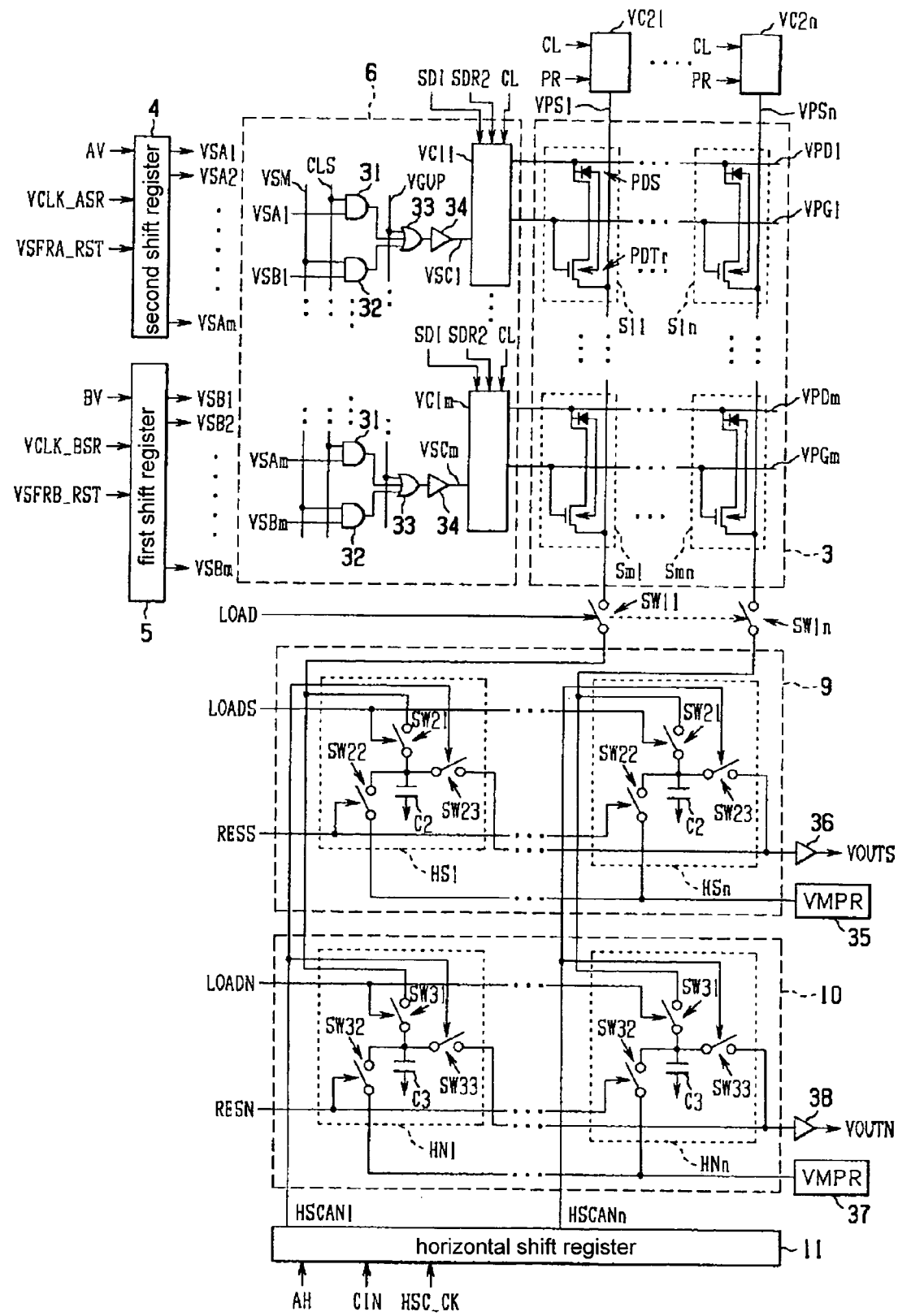
FIG. 2 is a circuit diagram showing a structure of an image sensor LSI related to the preferred embodiment of the present invention.

Next, a structure of the image sensor LSI 1 is explained. FIG. 2 shows a circuit diagram of the image sensor LSI 1.

The sensor cell array 3 is a matrix type solid-state image-pickup element that includes cells S11 to Smn of m×n (m rows and n columns). One cell corresponds to one unit pixel. Each cell corresponding to each unit pixel includes a photo diode PDS and a MOS transistor PDTr that is an insulated gate type field effect transistor for detecting a light signal. The photo diode PDS includes an impurity diffused region and a well region where holes are generated in response to incident light. The well region is shared commonly with the MOS transistor PDTr for detecting a light signal and forms the gate region of the MOS transistor PDTr for detecting a light signal. The impurity diffused region of the photo diode PDS and the drain diffused region of the MOS transistor PDTr for detecting a light signal are formed integrally on the surface of the well region. The drain diffused region is formed as the outer circumference of a ring-shaped gate electrode. The source-diffused region is formed in the center of the ring-shaped gate electrode. Within the well region under the gate electrode and the peripheral of the source diffused region, a carrier pocket is formed like surrounding the source diffused region. The details of the sensor structure are disclosed in the Japanese Patent Publication Laid-Open No. 11-195778.

In order to obtain a signal in response to an amount of light from the sensor cell array 3, a predetermined bias voltage is applied to the gate, source and drain of each cell in each of three states such as accumulation, reading out and clearing so as to obtain a signal in response to an amount of light. Simply stated, at the time of the accumulation state, holes generated in response to an amount of incident light to the photo diode PDS are stored in the carrier pocket. At the time of the reading out state, a signal voltage is read out based on accumulated holes. A read signal voltage corresponds to the difference between the gate voltage and threshold values varying in response to an amount of received light. At the time of the clearing state, the booster 7 boosts the source voltage of the MOS transistor PDTr for detecting a light signal to a predetermined value. Furthermore, the gate voltage is boosted to a predetermined value by coupling capacitance between the ring gate and the source so as to turn the MOS transistor PDTr for detecting a light signal "on" and form a channel under the ring gate. Therefore, the drain voltage becomes a value equivalent to the source voltage (when the drain voltage VD=VG−Vth and the gate voltage VG is sufficiently higher than the source voltage). Thus, the depletion layers under the source, channel and drain are spread out so as to sweep the accumulated holes out toward the substrate and exclude residual charges such as holes. After clearing, offset voltage including a noise component is read out and the difference between a signal voltage and the offset voltage is taken out so as to obtain an image signal. The above operation is executed for each cell and an image signal is obtained so as to obtain the two-dimensional image signal. A bias condition, namely a bias voltage applied to the gate, source and drain of each cell in each state is described below.

The second shift register 4 is a circuit that designates a line for clearing an image signal. Shift data AV applied to a line for clearing an image signal, a shift clock signal VCLK_ASR applied to a line for clearing an image signal and a reset signal VSFRA_RST are input to the second shift register 4. The second shift register 4 outputs a selection signal, VSA 1 to VSAm, which selects a line for clearing an image signal, which selects a line where accumulated charges are cleared in the sensor cell arrays 3 in a matrix.

The first shift register 5 is a circuit that designates a line for reading an image signal. Shift data BV applied to a line for reading an image signal, a shift clock signal VCLK_BSR applied to a line for reading an image signal and a reset signal VSFRB_RST applied to shift register are input to the first shift register 5. The first shift register 5 outputs a signal, VSB 1 or VSBm, for selecting a line for reading an image signal, which selects a line where signal voltage is read out in the sensor cell arrays 3 comprising a matrix.

The shift data AV and the shift data BV are given at the timing determined by shutter speed data such that the second shift register 4 and the first shift register 5 output selecting signals in order. In other words, the shift data BV is produced at predetermined timing with respect to the vertical synchronizing signal VSYNC. On the other hand, the phase relationship between the shift data BV and the shift data AV is determined by shutter speed. While maintaining such phase relationship, the second shift register 4 and the first shift register 5 output a selecting signal in order. In addition, as described below, when a line for reading an image signal and a line for clearing an image signal exist in one frame, two lines in the sensor array are designated and selected.

The vertical drive circuit 6 includes two AND circuits 31 and 32, an OR circuit 33, a buffer circuit 34 and a drain gate voltage supply circuit VC1$i$ ("i" is any one from 1 to m which is the same as follows) in every line. One AND circuit 31 receives the signal VSAi that selects a line for clearing an image signal and an enabling signal CLS that selects a line for clearing an image signal. The other AND circuit 32 receives the signal VSBi that selects a line for reading an image signal and an enabling a signal VSM that selects a line for reading an image signal and executes three operations such as reading a signal out, clearing it and reading a noise out. The OR circuit 33 receives a signal that is output from each of the AND circuits 31 and 32 and a signal VGUP for selecting all lines at the time of accumulation. The buffer circuit 34 receives a signal that is output from the OR circuit 33. An output signal from each buffer circuit 34 is supplied as a signal VSCi for selecting a line to the drain gate voltage supply circuit VC1$i$.

The drain gate voltage supply circuit VC1$i$ receives the signal VSCi for selecting a line, an accumulation-enabling signal SDI, a reading-out enabling signal SDR 2 and a clearing pulse signal CL. The drain gate voltage supply circuit VC1$i$ selects and outputs voltage that is applied to the gates and drains of all cells on a corresponding line. In other words, the drain gate voltage supply circuit VC1$i$ applies a drain voltage VPDi and a gate voltage VPGi to each cell on each line. The details of this drain gate voltage supply circuit VC1$i$ are described below.

The source voltage supply circuit VC2$h$ (h is any one from 1 to n that is the same hereafter) is arranged in every column of a matrix. The clearing pulse signal CL and a gate preset signal PR before clearing are input to the source voltage supply circuit VC2$h$. The source voltage supply circuit VC2$h$ applies a source voltage VPSh to the sources of all cells of each column. The details of this source voltage supply circuit VC2$h$ are described below.

A source line corresponding to each column is coupled to the line memory 9 that stores an accumulated signal and the line memory 10 that stores an offset signal via a switch SW1$h$. A data load signal LOAD applied to these line memories turns the switch SW1$h$ "on".

The line memory 9 for an accumulated signal includes a selection circuit HSh corresponding to each column. Each selection circuit HSh includes a capacitor C2 that stores accumulated charge, a switch SW21 for reading-in, a switch SW22 for reset, and a switch SW23 for output.

The line memory 10 includes a selection circuit HNh corresponding to each column. Each selection circuit HNh includes a capacitor C3 that stores accumulated charge, a switch SW31 for reading-in, a switch SW32 for reset, and a switch SW33 for output. When a data load signal LOADS is input to the line memory 9, the SW21 is turned "on" by this signal, a voltage corresponding to an amount of light is given to the capacitor C2 from each source line, and charges corresponding to the voltage are stored in the capacitor C2. Pixel signals in one line that are selected by the first shift register 5 are stored in the line memory 9 in response to the data load signal LOADS.

A reset signal RESS applied to the line memory 9 turns a switch 22 "on" so as to apply a predetermined voltage VMPR to the capacitor C2 via the switch 22 just before reading a signal out. The voltage VMPR is a power potential 35 generated by the regulator 8.

Then, the switch SW23 of each selection circuit HSh of the line memory 9 for an accumulation signal is turned "on" sequentially by a selecting signal HSCANh from the horizontal shift register 11. The switch SW23 that was turned "on" outputs the voltage corresponding to charges stored in the capacitor C2, and pixel signals of one line selected by the first shift register 5 is output sequentially as the voltage output signal VOUTS via an output amplifier 36.

When a data load signal LOADN is input to the line memory 10, the switch SW31 connected to the line memory is turned "on" by this signal. Then, a voltage corresponding to offset component is given from each source line and charges corresponding to the voltage are stored in the capacitor C3. Pixel signals in one line that is selected by the first shift register 5 are stored in the line memory 10 in response to the data load signal LOADN. A reset signal RESN applied to the line memory turns the switch 32 "on" so as to apply the predetermined voltage VMPR to the capacitor C3 just before reading out an offset component signal. The voltage VMPR is a power potential 37 generated by the regulator 8.

Then, the horizontal shift register 11 turns the switch SW33 of each selection circuit HNh of the line memory 10 for an offset signal "on" sequentially. The switch SW33 that was turned "on" outputs the voltage corresponding to charges stored in the capacitor C3, and offset component signals of pixel signals of one line selected by the first shift register 5 are output sequentially as the voltage output signal VOUTN via an output amplifier 38. Two voltage output signals VOUTS and VOUTN from the image sensor LSI 1 are input to the differential amplifier 16 of the signal processor LSI 2.

Figure 3:
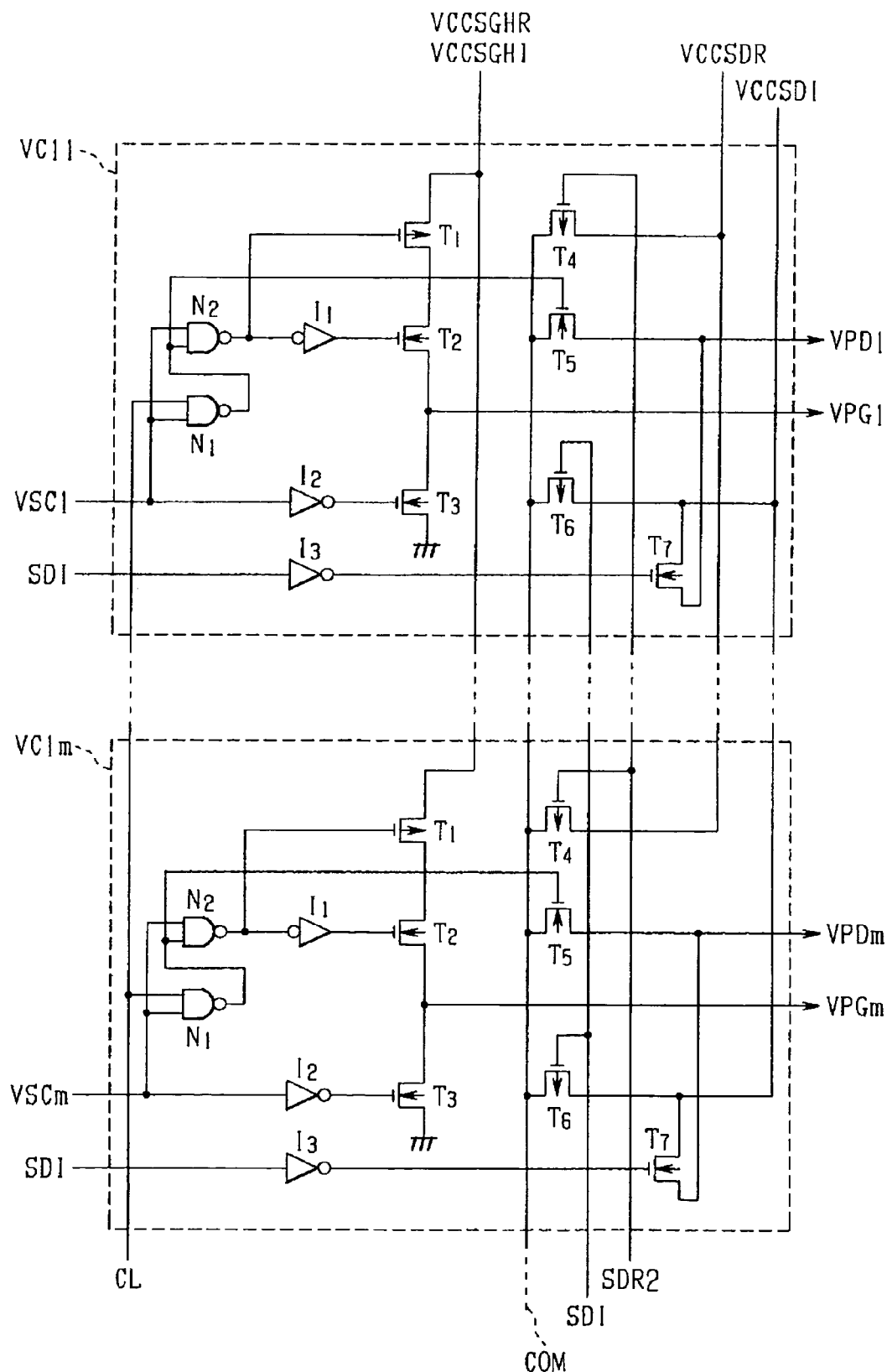
FIG. 3 is a circuit diagram showing a structure of a drain gate voltage supply circuit related to the preferred embodiment of the present invention.

FIG. 3 is a circuit diagram which shows the drain gate voltage supply circuits VC 11 to VC 1m of FIG. 2. The drain gate voltage supply circuit VC1i includes a NAND circuit, an inverter circuit and a transistor and outputs the gate voltage VPG and the drain voltage VPD in response to various input signals.

The clearing pulse signal CL, the accumulation-enabling signal SDI and the reading-out enabling signal SDR 2 are input to each drain gate voltage supply circuit VC1i. Furthermore, it produces bias voltages in FIG. 5 by using voltages VCCSGHR, VCCSGHI, VCCSDR and VCCSDI that are supplied and applies the bias voltages to the drain and gate of each sensor cell.

The sensor cell array 3 has the following states. Each of these states includes "accumulation", "reset (S)", "modulation (S)", "preset", "clearing", "reset (N)" and "modulation (N)" in detail, and an optical image is converted into an electrical signal so as to be output by repeating each of these states. The accumulation-enabling signal SDI is a low active signal showing an accumulation period. The reading-out enabling signal SDR 2 is a signal which is produced based on a signal SDR showing a period except the accumulation period and becomes low active at the time of modulation, offset modulation and clearing. In addition, the signal VSCi for selecting a line is used for selecting a line for reading out an image signal and a line for clearing an image signal. The clearing pulse signal CL is set in a period for discharging residual charge such as accumulated holes.

In FIG. 3, it is assumed that the clearing pulse signal CL is an L level, and the signal VSCi for selecting a line becomes an H level. In this case, a P-channel MOS transistor T1 and an N-channel MOS transistor T2 are turned "on" and a P-channel MOS transistor T3 is turned "off". Then, the gate voltage VPGi becomes the voltage VCCSGHI or the voltage VCCSGHR. In addition, the P-channel MOS transistor T1 is an enhancement type and the N-channel MOS transistor T2 is a depletion type MOS transistor.

On the contrary, when the clearing pulse signal CL is an H level and the signal VSCi for selecting a line are an L level, the transistors T1 and T2 are turned "off" and the transistor T3 is turned "on". In this case, the gate voltage VPGi becomes a low level. In addition, when the clearing pulse signal CL and the signal VSCi for selecting a line are H level, the transistors T1, T2 and T3 are turned "off" and the gate becomes a floating state.

In addition, when the clearing pulse signal CL is an L level or the signal VSCi for selecting a line is an L level, an N-channel MOS transistor T5 is turned "on". The source of the transistor T5 for each line is commonly connected to form a COM node. When the transistor T5 is turned "on", the drain of each line is connected to the COM node and becomes a floating state. In the case when the transistor T5 is the "on" state, and when the accumulation-enabling signal SDI is an L level, a P-channel MOS transistor T6 and an N-channel MOS transistor T7 are turned "on" and the drain voltage VPDi becomes the voltage VCCSDI. In the case when the transistor T5 is the "on" state, and when the reading-out enabling signal SbR2 is an L level, the P-channel MOS transistor T4 is turned "on" and the drain voltage VPDI becomes the voltage VCCSDR. In the case when only the transistor T5 among transistors T4 to T7 is the "on" state, all drains are connected to COM node that is a floating state to be HiZ.

In addition, the transistor T1 receives the voltage VCCSGHI when the accumulation-enabling signal SDI is an L level, and receives the voltage VCCSGHR when the signal SDR is an L level.

Namely, the circuit of FIG. 3 obtains the states described in the following Table 1. Here, only H level and L level of signals which are paid attention to are shown in Table 1.

TABLE 1

| VSCi | CL | SDI | SDR 2 | |
|------|----|----|-------|---|
|      |    |     |       | VPGi |
| L    | L  |     |       | L (GND) |
| L    | H  |     |       | L (GND) |
| H    | L  | L   |       | VCCSGHI |
| H    | L  |     | L     | VCCSGHR |
| H    | H  |     |       | Floating |
|      |    |     |       | VPDi |
| L    |    | L   |       | VCCSDI |
|      | L  | L   |       | VCCSDI |
| L    |    |     | L     | VCCSDR |
|      | L  |     | L     | VCCSDR |
|      | L  | H   | H     | HiZ |

FIG. 4A is a circuit diagram of the source voltage supply circuits VC21 to VC2n shown in FIG. 2. The source voltage supply circuit VC2h includes capacitors and transistors and outputs the source voltage VPSh in response to various kinds of input signals.

FIG. 4B shows a circuit that produces signals S1, S2, S3 and S4 shown in FIG. 4A.

The signals S1 to S3 that are the inverted signals of the clearing pulse signal CL and the signal S4 that is a positively inverted signal of the gate preset signal PR are input to the source voltage supply circuit VC2h. Further, it produces the SOURCE bias voltage shown in FIG. 5 by using signals VCCSDB and VCCVPS that are supplied and applies it to the source of each sensor cell.

In FIG. 4B, the signals S1 to S3 are inverted signals of the clearing pulse signal CL and the signal S4 that is a positively inverted signal of the gate preset signal PR is a signal having the same logic level of the gate preset signal PR before clearing. When both the clearing pulse signal CL and the gate preset signal PR before clearing are L levels, the signals S1 to S3 are an H level and the signal S4 is an L level.

Therefore, N-channel MOS transistors T11 and T13 are "on", P-channel MOS transistors T12 and T14 are "off" and an N-channel MOS transistor T15 is "off". Namely, in this case, the transistors T14 and T15 are "off" such that the source voltage supply circuit VC2h does not supply the source voltage. At this time, a voltage value at the point ND1 is ground level (GND) and a voltage value at the point ND2 is VCCSDB.

In addition, the signals S1 to S3 and the signal S4 are H levels when the clearing pulse signal CL is an L level and the gate preset signal PR before clearing is an H level. Therefore, the transistors T11, T13, and T15 are "on", and the transistors T12, and T14 are "off". Namely, in this case, the source voltage VPSh becomes the voltage VCCVPS, the voltage value at the point ND1 is a ground level (GND) and a voltage value at the point ND2 is VCCSDB. Therefore, the capacitor C1 is charged to the voltage VCCSDB during this time.

In addition, when the clearing pulse signal CL is an H level and the gate preset signal PR before clearing is. an L level, the signals S1 to S4 are L levels. Therefore, the transistors T11, T13, and T15 are "off", and the transistors T12, and T14 are "on". Namely, in this case, the voltage at the point ND2 becomes the source voltage VPSh. If the voltage of the capacitor C1 is charged to be the VCCSDB just before this case, the voltage value at the point ND1 becomes the voltage VCCSDB by turning the transistor T12 "on" such that the voltage at the point ND2 becomes VCCSD×2.

Namely, the circuit of FIG. 4 obtains the states of the following Table 2.

TABLE 2

|    | CL | PR | VPSh |
|----|----|----|------|
| 1) | L  | L  | Voltage is not supplied |
| 2) | L  | H  | VCCVPS |
| 3) | H  | L  | If it is just after state of 2) VCCSDB×2 |

FIG. 5 is a diagram for explaining a bias voltage applied to the sensor cell.

FIG. 5 shows the voltage values of the gate voltage, source voltage and drain voltage of each cell in each state. In addition, in FIG. 5, these are divided into states of "accumulation", "reset (S)", "modulation (S)", "preset", "clearing", "reset (N)" and "modulation (N)" in terms of bias voltages.

In FIG. 5, GATE is a gate voltage of a cell that includes two states such as a selected state and a non-selected state. SOURCE is a source voltage of a cell. DRAIN is a drain voltage of a cell that includes two states such as a selected state and a non-selected state.

At first, the case of an accumulation. state is described.

When the state of "accumulation" (it is referred to as accumulation state hereafter), all cells in a cell array are in a selected state and a voltage of which value is the VCCSGHI is applied to the gate. At the time of the accumulation state, there is no cell in the non-selected state. At the time of the accumulation state, the source does not receive the bias voltage from the source voltage supply circuit VC2h; but the gate receives the voltage of VCCSGHI and the MOS transistor PDTr for detecting a light signal is turned "on" such that the path between the source and the drain becomes a conductive state and the source becomes the drain voltage (VCCSDI) in the accumulation state.

Next, the state of "reset (S)" (it is abbreviated with RESS state hereafter.) is described.

In the case of a cell with a selected state, at the time of the RESS state, the voltage of which value is Lo (L level) is applied to the gate. At the time of the RESS state, the voltage of which value is VMPR is applied to the source.

In the case of a cell with a selected state, at the time of the RESS state, the voltage Lo is applied to the gate and the MOS transistor PDTr for detecting a light signal is turned "off" such that the path between the source and the drain becomes a non-conductive state and the drain becomes high impedance (HiZ).

In addition, in the case of a cell with a non-selected state, at the time of the RESS state, the voltage of which value is Lo (L level) is applied to the gate. When a certain cell is a non-selected state and the state is the RESS state, the drain becomes HiZ.

In the state of "modulation (S)" (it is abbreviated with LOADS state hereafter), in the case of a cell with a selected state, the voltage of which value is VCCSGHR is applied to the gate. In the case of a cell with a selected state, the voltage of which value is VCCSDR is applied to the drain and the voltage of which value is (VCCSGHR−VthS) is applied to the source. In the case of the LOADS state, it is necessary to apply the bias voltage having the relationship of (VCCSGHR<VCCSDR).

In addition, in the case of a cell with a non-selected state, at the time of the LOADS state, the voltage of which value is Lo is applied to the gate and the voltage of which value is VCCSDR is applied to the drain.

Next, the state of "preset" (it is abbreviated with the PR state hereafter) is described.

In the case of a cell with a selected state, at the time of the PR state, the voltage of which value is VCCSGHR is applied to the gate. At the time of the PR state, the voltage of which value is VCCVPS is applied to the source. In the case of a cell with a selected state, at the time of the PR state, the MOS transistor PDTr for detecting a light signal is turned "on" such that the drain voltage becomes the same voltage of the source.

In addition, in the case of a cell with a non-selected state, at the time of the PR state, the voltage of which value is Lo is applied to the gate and the voltage of the drain becomes VCCVPS. In a line where VSCi is a Lo level (=a non-selected line), the transistor T5 is turned "on" such that each line is connected to the common node (COM node) and the COM node becomes HiZ.

At the time of the state of "clearing" (it is abbreviated with the CL state hereafter), in the case of a cell with a selected state, the voltage of which value is (VCCSDB×2) is applied to the source, and the MOS transistor PDTr for detecting a light signal is turned "on" such that the voltage of the drain becomes the same voltage of the source. As a result, the voltage of which value is (VCCSGHR+VCCSDB×2) is applied to the gate.

In addition, in the case of a cell with a non-selected state, at the time of the CL state, the voltage of which value is Lo is applied to the gate and the voltage of which value is VCCSDR is applied to the drain.

Next, the state of "reset (N)" (it is abbreviated with the RESN state hereafter) is described.

In the case of a cell with a selected state, at the time of the RESN state, the voltage of which value is Lo is applied to the gate. At the time of the RESN state, the voltage of which value is VMPR is applied to the source. In the case of a cell with a selected state, the drain becomes HiZ at the time of the RESN state.

In addition, in the case of a cell with a non-selected state, the voltage of which value is Lo is applied to the gate at the time of the RESN state. In the case of a cell with a non-selected state, the drain becomes HiZ at the time of the RESN state.

Here, during a period when the clearing pulse signal CL is an L level, the N-channel MOS transistor T5 of FIG. 3 is turned "on". Therefore, even in the RESS state, the N-channel MOS transistor T5 is turned "on" and the drain is connected to the COM node. The reading-out enabling signal SDR 2 becomes an H level in the states of RESS and RESN so as to turn the P-channel MOS transistor T4 "off" such that the COM node becomes floating state.

In the state of "modulation (N)" (it is abbreviated with LOADN state hereafter), the voltage of which value is VCCSGHR is applied to the gate in the case of a cell with a selected state. At the time of the LOADN state, the voltage of which value is VCCSDR is applied to the drain and the voltage of which value is (VCCSGHR−VthN) is applied to the source.

In addition, in the case of a cell with a non-selected state, at the time of the LOADN state, the voltage of which value is Lo is applied to the gate and the voltage of which value is VCCSDR is applied to the drain.

Similarly to the LOADS state, at the time of the LOADN, the transistor T5 of FIG. 3 is turned "on" such that the drain is connected to the COM node (=HiZ).

Figure 6:
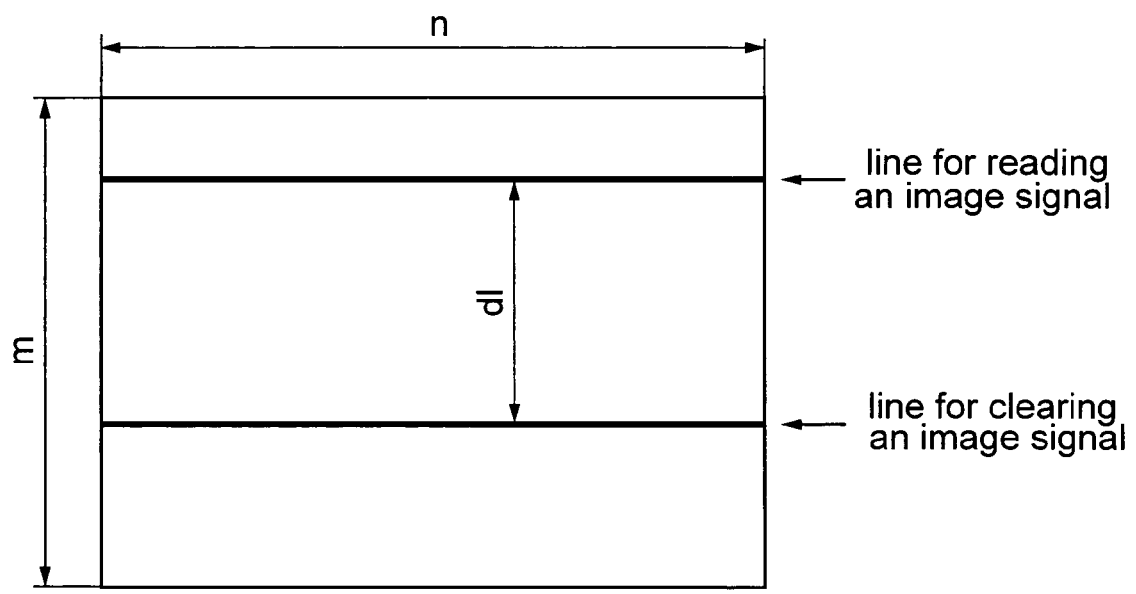
FIG. 6 is a diagram explaining a line for reading out an image signal and a line for clearing an image signal of a sensor of the preferred embodiment of the present invention.

FIG. 6 shows a diagram for explaining a line for reading out an image signal and a line for clearing an image signal of a sensor.

As shown in FIG. 6, in a matrix of m×n, each line from the first line to the mth line is scanned sequentially. A line for reading out an image signal is a line where a signal corresponding to quantity of light is read out, and a line for clearing an image signal is a line where charges stored in each cell are cleared. Each line is scanned sequentially from the first line such that each cell in a line that is cleared based on the signal for selecting a line for clearing an image signal produces holes corresponding to an amount of received light after clearing. After clearing, time when the line has been read out by the signal VSBi for selecting a line for reading out an image signal is time for the exposure. The exposure time is proportional to the number of line d1 between line for reading out an image signal and line for clearing an image signal and can be changed by setting of a shutter speed. In other word, this time can be changed by setting the range from 1H (H means the number of horizontal lines hereafter) to mH (or 1 frame+more than 1 H may be enough).

Figure 7:
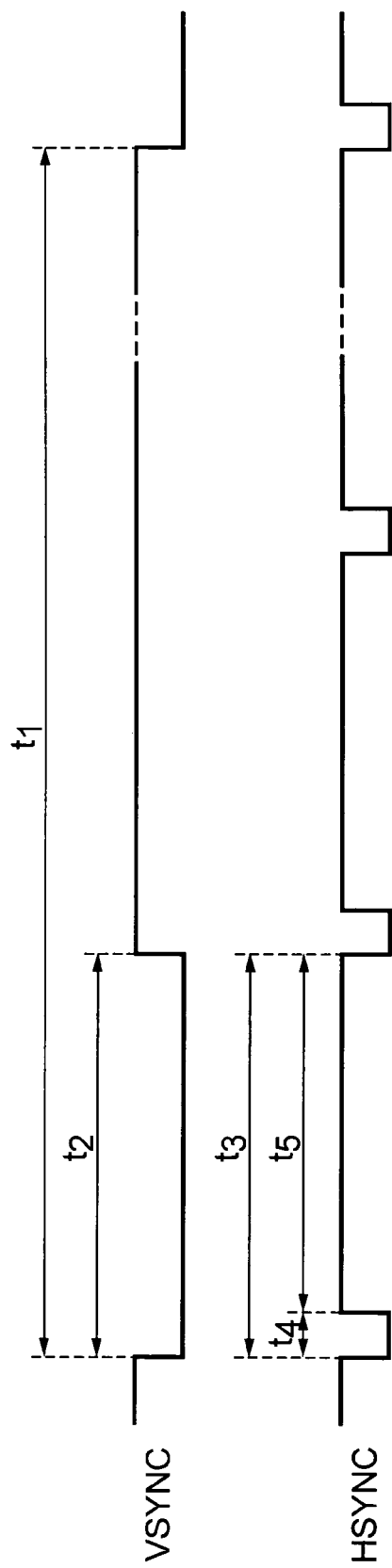
FIG. 7 is a timing chart showing timing chart of a vertical synchronizing signal and a horizontal synchronizing signal related to the preferred embodiment of the present invention.

FIG. 7 is a timing chart showing timing of the vertical synchronizing signal VSYNC and the horizontal synchronizing signal HSYNC.

The vertical synchronizing signal VSYNC is a timing pulse produced every period t1 and its length is t2. The horizontal synchronizing signal HSYNC is a timing pulse produced every period t3 and its length is t4. The vertical synchronizing signal VSYNC and the horizontal synchronizing signal HSYNC are applied to the image sensor LSI 1 from the timing generator 26 of the signal processor LSI 2.

The first shift register 5 outputs the signal VSBi for selecting a line for reading out an image signal sequentially when the vertical synchronizing signal VSYNC is applied. Within a period t1 after applying the vertical synchronizing signal VSYNC, a plurality of the horizontal synchronizing signals HSYNC are output by the number of lines (=m) in the sensor. cell array 3. Furthermore, within the period t4 when the horizontal synchronizing signal HSYNC is output and the VGUP is L, there exists a period when the above-mentioned reading a signal component out, clearing, and reading the offset component out are executed. The period when the VGUP is L is set to be a predetermined period within H blanking period. The H blanking period is explained in detail by using FIG. 9 later.

Within a period t5 after the period t4 within the period t3, n number of signal components and offset components, namely the analog signals VOUTS and VOUTN are output.

Figure 8:
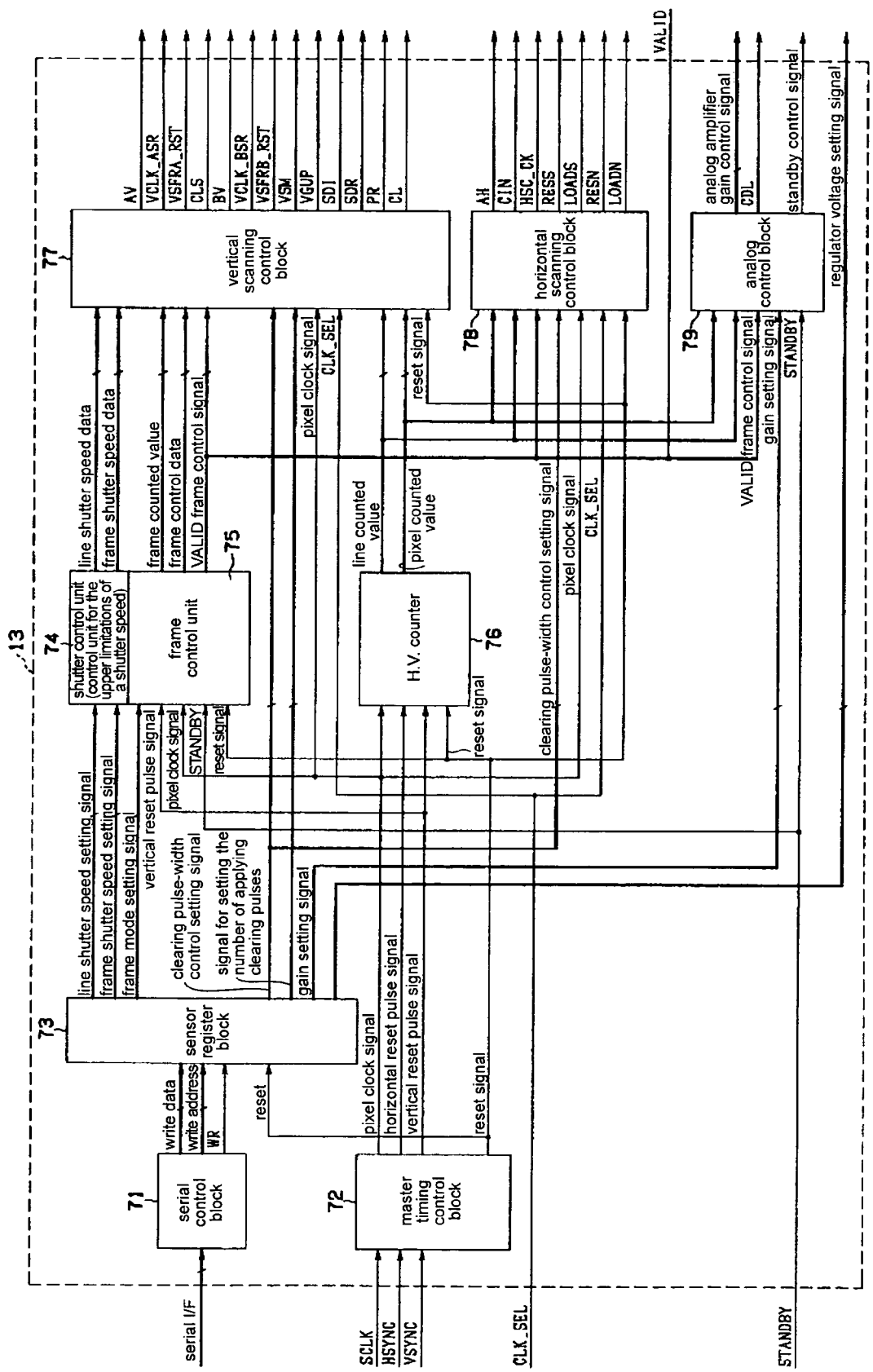
FIG. 8 is a circuit block diagram showing a structure of a timing generator of an image sensor LSI related to the preferred embodiment of the present invention.

Next, the circuit structure of the timing generator (it is referred to as TG hereafter) 13 of the image sensor LSI 1 is described referring to FIG. 8.

FIG. 8 is a circuit block diagram showing a structure of the TG 13 of the image sensor LSI 1 of FIG. 1.

The TG 13 includes a serial control block 71, a master timing control block 72, a sensor register block 73, a shutter control unit (a control unit for the upper limitation of a shutter speed) 74, a frame control unit 75, an H·V counter 76, a vertical scanning control block 77, a horizontal scanning control block 78, and an analog control block 79.

To and from the serial control block 71, a three line serial I/F signal that is an interface signal between the serial control block 71 and the register 14 of the signal processor LSI 2 is input and output.

To the master timing control block 72, the sensor drive clock signal SCLK, the horizontal synchronizing signal HSYNC and the vertical synchronizing signal VSYNC are input from the TG26 of the signal processor LSI 2. In addition, the clock designating signal CLK_SEL and the standby signal STANDBY are input to the TG13 inputs from the signal processor LSI2.

The serial control block 71 receives setting data of a shutter speed written to the register 23 of the signal processor LSI 2, setting data of the regulator 8 and system clock information as serial I/F signals. Based on these data, it outputs write data, write address and a write strobe signal WR and applies these data and the signal to the sensor register block 73.

In response to the above input signals, the sensor register block 73 outputs a line shutter speed setting signal, a frame shutter speed setting signal, a frame mode setting signal, a clearing pulse-width control setting signal, a signal for setting the number of applying clearing pulses, a gain setting signal and a regulator voltage setting signal.

On the other hand, the master timing control block 72 outputs a pixel clock signal, a horizontal reset pulse signal, a vertical reset pulse signal and a reset signal based on the above-mentioned various input signals.

To the shutter control unit (the control unit for the upper limitation of a shutter speed) 74, the line shutter speed setting signal and the frame shutter speed setting signal from the sensor register block 73 are input. The shutter control unit 74 outputs line shutter speed data and frame shutter speed data.

To the frame control unit 75, the pixel clock signal, the vertical reset pulse signal and the reset signal from the master timing control block 72 and the above-mentioned standby signal STANDBY are input. The frame control unit 75 outputs a frame counted value, frame control data and a valid (VALID) control signal.

In addition, to the H·V counter 76, the pixel clock signal, the horizontal reset pulse signal, the vertical reset pulse signal and the reset signal from the master timing control block 72 are input. The H·V counter 76 outputs a line counted value and a pixel counted value.

To the vertical scanning control block 77, the line shutter speed data and the frame shutter speed data from the shutter control unit 74, the frame counted value, the frame control data and the valid (VALID) control signal from the frame control unit 75, the clearing pulse-width control setting signal and the signal for setting the number of the applying clearing pulse from the sensor register block 73, the pixel clock signal, the reset signal and the clock designating signal CLK_SEL from the master timing control block 72 and the line counted value and the pixel counted value from the H·V counter 76 are input.

Further, the vertical scanning control block 77 outputs the shift data AV applied to a line for clearing an image signal, the shift. clock signal VCLK_ASR applied to a line for clearing an image signal, the reset signal VSFRA_RST applied to a shift register for clearing a line, the enabling signal CLS for selecting a line for clearing an image signal, the shift data BV applied to a line for reading an image signal, a shift clock signal VCLK_BSR applied to a line for reading out image signal, the reset signal VSFRB_RST applied to shift register for reading out an image signal, the enabling signal VSM that selects a line for reading an image signal, the signal VGUP for selecting all lines at the time of accumulation, the accumulation-enabling signal SDI, the reading-out enabling signal SDR2, the gate preset signal PR before clearing and the clearing pulse signal CL.

To the horizontal scanning control block 78, the valid (VALID) control signal from the frame control unit 75, the line counted value and the pixel counted value from the H·V counter 76, the clearing pulse-width control setting signal from the sensor register block 73, and the pixel clock signal, the reset signal and the clock designating signal CLK_SEL from the master timing control block 72 are input.

The horizontal scanning control block 78 outputs shift data AH for selecting a line memory, a shift clock signal CIN for selecting a line memory, an enabling signal HSC_CK for selecting a line memory, the reset signal RESS, the data load signal LOADS, the reset signal RESN and the data load signal LOADN.

The above clock designating signal CLK_SEL is a signal indicating high and low of frequency of the system clock signal CLKIN. This CLK_SEL is applied to the vertical scanning control block 77 and the horizontal scanning control block 78. Each of control blocks 77 and 78 controls output timing of various driving signals for sensors output from each of control blocks 77 and 78 in response to H or L level of the clock designating signal CLK_SEL.

To the analog control block 79, the valid (VALID) control signal from the frame control unit 75, the line counted value and the pixel counted value from the H·V counter 76, the gain setting signal from the sensor register block 73, and the standby signal STANDBY are input. Further, the analog control block 79 outputs an analog amplifier gain control signal, a clock signal CDL for driving amplifier and a standby control signal.

Further, the valid (VALID) control signal from the frame control unit 75 is applied to the signal processor LSI 2 from the TG 13 as the valid signal.

In addition, the regulator voltage setting signal from the sensor register block 73 and the standby control signal from the analog control block 79 are input to the regulator 8 for producing a bias of driving a sensor in the image sensor LSI 1 of FIG. 1.

The analog amplifier gain control signal and the clock signal CDL for driving an amplifier from the analog control block 79 becomes the control signal for the output amplifier 12 of the image sensor LSI 1 of FIG. 1.

Figure 9:
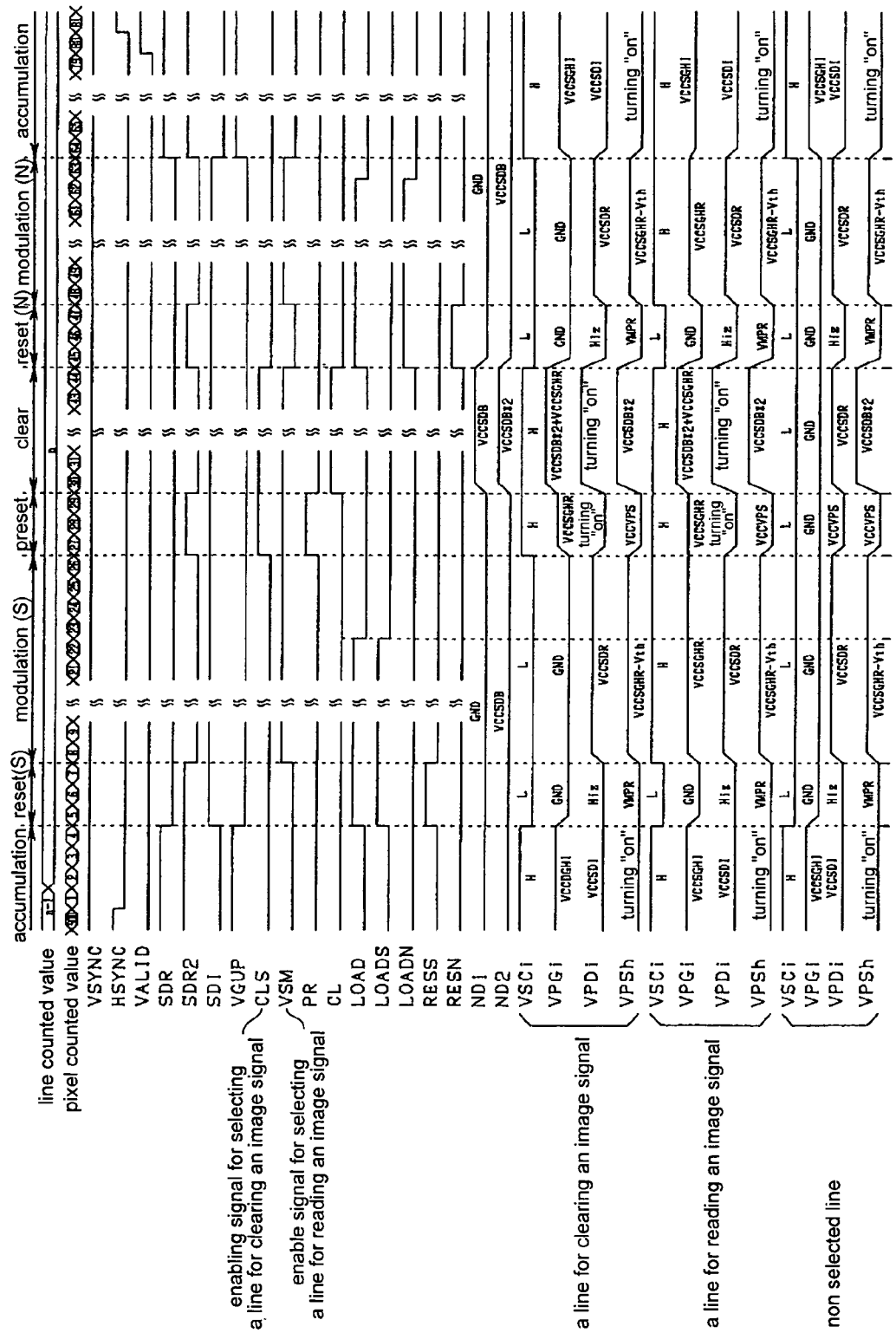
FIG. 9 is a timing chart explaining a state of each signal in each state within an H blanking period related to the preferred embodiment of the present invention.

FIG. 9 is a timing chart showing each signal of controlling photoelectric conversion of the sensor cell array 3. The sensor cell array 3 converts an optical image to an electrical signal and output it by repeating each state of "accumulation", "reset (S)", "modulation (S)", "preset", "clearing", "reset (N)" and "modulation (N)". FIG. 9 shows a manner of each signal in these states. The sensor cell array 3 works with a predetermined frame rate where the vertical synchronizing signal VSNYC and the horizontal synchronizing signal HSYNC in FIG. 7 are referred to as a unit time.

In the example of FIG. 9, regarding a certain line count signal ROWCT, the HSYNC is an L level during the term when a pixel clock signal PXLCT is from 1 to 80. Further, the state of LOADS (reset (S)+modulation (S)) is assigned during the term when the PXLCT is from 5 to 26, the state of CL (preset+clearing) is assigned during the term when the PXLCT is from 27 to 44, and the state of LOADN (reset (N)+modulation (N)) is assigned during the term when the PXLCT is from 45 to 63.

In addition, each control signal is produced by the TG 13. The TG 13 includes a logic circuit. This logic circuit is automatically designed by using a designing system HDL (Hardware Description Language) such as Verilog-HDL, VHDL and others.

At first, the accumulation state is described.

This accumulation period is a period except a predetermined period in the H blanking period shown in FIG. 7 (from the 5th pixel to the 63rd pixel in FIG. 9). In the accumulation period, all pixels become the accumulation state. In this period, the signal VGUP for selecting all lines at the time of accumulation is an H level and the accumulation-enabling signal SDI and the clearing pulse signal CL are an L level. As shown in FIG. 2, when the signal VGUP for selecting all lines at the time of accumulation is an H level, all of the signal VSCi for selecting a line become an H level and the gate voltage VPGi becomes VCCSGHI as shown in Table 1 which indicates the operation of the drain gate voltage supply circuit VC1$i$.

In addition, the drain voltage VPDi becomes the voltage VCCSDI. In addition, the gate preset signal PR before clearing is an L level during this period and the source voltage supply circuit VC2$h$ does not supply a source voltage as shown in Table 2 which indicates the operation of the source voltage supply circuit VC2$h$. In this case, the voltage of the sources of all cells in a cell array becomes the drain voltage when the MOS transistor PDTr for detecting a light signal is turned "on".

The accumulation period is completed in the 5th pixel of the H blanking period and reading a signal out starts. In the period for reading a signal out (the periods for LOADS, CL, and LOADN), accumulation of holes based on an amount of received light is continued, but each cell is set to be a value different from that in the accumulation period. In addition, in the period for reading a signal out, each cell is set to be an individual value at a line for clearing an image signal, a line for reading out an image signal or a non-selected line.

At first, the reset (s) state is described. As shown in FIG. 9, even in this period, a setting which is common for all cells is executed.

As shown in FIG. 9, the clearing pulse signal CL and the gate preset signal PR before clearing are L levels and the source voltage supply circuit VC2$h$ does not supply the source voltage. During this period, the reset signal RESS is activated, and the switch SW22 of FIG. 2 is turned "on" such that the voltage of the end of the capacitor C2 which forms the line memory is charged to the VMPR. Furthermore, the data load signal LOADS and the data load signal LOAD are activated, the switch SW21 and the switch SW11 are turned "on" and the source line is initialized by the voltage VMPR.

On the other hand, the signal VGUP for selecting all lines at the time of accumulation varies from H to L and all of the signal VSCi for selecting a line is turned to be an L level. Therefore, as shown in Table 1, all of the gate voltage VPSGi becomes an L (GND) level. In addition, the accumulation-enabling signal SDI is an H level and the SDR2 is also an H level, such that the drains of all cells are connected commonly (COM node) and the COM node becomes HiZ state since the T5 in FIG. 3 has been turned "on" as shown in Table 1.

Next, the modulation (s) state is described.

As shown in FIG. 9, the CL and PR keep L levels and the source voltage supply circuit VC2h does not supply a voltage to a source line. The voltage corresponding to a predetermined value set to each cell is output via the source line. Namely, regarding a line for clearing an image signal and non-selected line, the signal VSCi for selecting a line holds an L level and the gate voltage is an L (GND) level. In addition, the reading-out enabling signal SDR2 is also an L level such that the drain voltage VPDi becomes VCCSDR.

Regarding the line for reading out an image signal, the signal VSCi for selecting a line is an H level. The clearing pulse signal CL and the signal SDR are L levels such that the gate voltage VPGi is VCCSGHR. The drain voltage VPDi is VCCSDR. Thus, the source voltage VPSi shows voltage (VCCSGHR−VthS) thereby. In addition, VthS varies depending on accumulated holes. The voltage of a source line (VCCSGHR−VthS) is stored in each capacitor C2 which forms the line memory via the switch SW21.

Next, in order to process correlation double sampling, the CL state for removing (clearing) holes stored in each cell of the line for reading out an image signal is set. It is necessary to apply extremely high voltage to the gate in order to remove holes. This high voltage is obtained by setting the preset state before the clearing state and using a booster. In addition, each cell is cleared at the same time when clearing of a line for reading out an image signal simultaneously.

At first, in the preset state, regarding a line for reading out an image signal and a line for clearing an image signal, the signal VSCi for selecting a line is an H level. The clearing pulse signal CL and the signal SDR are L levels such that the gate voltage VPGi is VCCSGHR. In addition, regarding a non-selected line, the signal VSCi for selecting a line is an L level such that the gate voltage is an L (GND) level.

In addition, the clearing pulse signal CL is an L level and the gate preset signal PR before clearing is H such that the voltage for all source lines VPSh is reset to the voltage VCCVPS (0V, for example) as shown in Table 2. In addition, the voltage VCCSDB is charged to the capacitor Cl of FIG. 4, and the point ND2 becomes the voltage VCCSDB. In addition, the accumulation-enabling signal SDI and the reading-out enabling signal SDR2 are H levels such that the drain voltage becomes the same level as the source voltage since the MOS transistor PDTr for detecting a light signal is turned "on".

Next, in the clearing state, the gate preset signal PR before clearing varies from an H level to an L level and the clearing pulse signal CL varies from an L level to an H level. In this case, a source line changes to the voltage VCCSDB×2 as shown in Table 2. In addition, regarding a line for reading out an image signal and a line for clearing an image signal, the clearing pulse signal CL and the signal VSCi for selecting a line are H levels such that the gate becomes a floating state, as shown in Table 1. Therefore, the gate voltage VPGi becomes (VCCSDB×2+VCCSGHR) by coupling capacitance of the source with the gate. In addition, the drain voltage of the MOS transistor PDTr for detecting a light signal becomes the same level as the source voltage since the MOS transistor is turned "on" similar to the preset state.

On the other hand, regarding a non-selected line, the gate voltage VPGi holds an L (GND) level, and the drain voltage VPDi becomes VCCSDR when the transistor T4 is turned "on".

Next, a state is shifted to the modulation (N) state via the reset (N) state. In these reset (N) state and modulation (N) state, signals almost similar to that of the reset (s) state and the modulation (s) state are set. Namely, in the reset (N) state, the reset signal RESN applied to line memory for an offset signal, the data load signal LOADN applied to line memory for an offset component accumulation signal are activated instead of the reset signal RESS applied to line memory for an accumulation signal and the data load signal LOADS applied to line memory for an accumulation signal, respectively. The switch SW32 is turned "on" thereby, and the capacitor C3 forming a line memory for reading a noise out is charged to the VMPR. Furthermore, the switch SW31 and the switch SW11 are turned "on", and a source line is. initialized with the voltage VMPR.

In the modulation (N) state, the clearing pulse signal CL and the gate preset signal PR before clearing are L levels, and the source voltage supply circuit VC2h does not supply voltage to a source line. Regarding a line for clearing an image signal and a non-selected line, the signal VSCi for selecting a line is an L level and the gate voltage VPGi is L (GND). In addition, the reading-out enabling signal SDR2 is also an L level such that the drain voltage VPDi becomes VCCSDR.

Regarding a line for reading out an image signal, the signal VSCi for selecting a line is an H level. The clearing pulse signal CL and the signal SDR are L levels such that the gate voltage VPGi is VCCSGHR. The drain voltage VPDi is VCCSDR. The source voltage VPSh shows the voltage (VCCSGHR−VthN) thereby. The voltage shown in the source is set to the cleared state just before such that it is corresponding to the offset component. The voltage of a source line (VCCSGHR−VthN) is stored in each capacitor C3 which forms a line memory via the switch SW31.

Thus, the signal component is stored in the capacitor C2 and the offset component is stored in the capacitor C3. The switches SW23 and SW33 are turned "on" in order by the selecting signal HSCANh from the horizontal shift register 11 such that the voltage stored in the capacitors C2 and C3 are output as VOUTS and VOUTN via the output amplifiers 36 and 38, respectively.

Next, the control of the shift register connected to a line for reading out an image signal and the shift register connected to a line for clearing an image signal in the case when various conditions for picking an image up by a solid-state image-pickup element is changed, is explained. At first, the necessity for control of dummy reading out during an accumulation period is described.

If a condition for picking an image up, such as, for example, a shutter speed is changed during the operation of picking an image up by the image sensor LSI 1, in the state where the shift data AV that is determined by a shutter speed before the change is shifted in the second shift register 4, another shift data AV is input to the second shift register 4 with timing determined by a shutter speed after the change. As a result, two signals for selecting a line for clearing an image signal exist during the subsequent accumulation period, namely an exposure cycle, so that some parts having different image qualities are generated in one image.

During an H blanking period, the amount of capacitance held by the source line is changed thereby between a case of selecting one line for clearing an image signal and another case of selecting two line for clearing an image signal, for example. Therefore, in these two cases, the sates of carriers in the sensor cell array 3 after clearing, amounts of residual charges for example are different. As a result, some parts having different image qualities are generated in one image read during the next VALID cycle. Here, a cycle following the exposure cycle is defined as the non-VALID cycle, namely a cycle where the valid signal is an L level. It is considered that an image during the non-VALID cycle is not used as an output image.

However, an image in a non-VALID cycle is a useless image since it is not used for an output image. In particular, when a shutter speed is changed by automatic exposure control, the frame rate is lowered.

Thus, in order to avoid generating a useless image in the case when a condition for picking an image up such as a shutter speed is changed here, the reset signal VSFRA_RST applied to shift register connected to a line for clearing an image signal is input to the second shift register 4 at the predetermined timing that is time of starting exposure cycle after changing a condition for picking an image up or before such time. Further, the shift data BV as dummy is input to the first shift register 5 during the exposure cycle. As a result, in the exposure cycle and the VALID cycle following the exposure cycle (an accumulation period), the number of lines for reading out an image signal and line for clearing an image signal of both cycle are the same such that a cycle following the exposure cycle becomes the VALID cycle.

Here, the predetermined timing when the reset signal VSFRA_RST is input to the second shift register 4 is, for example, after the H blanking period.

Furthermore, when another various conditions for picking an image up are changed during the operation of a solid-state image-pickup element, it is considered that a cycle following the exposure cycle is defined as non-VALID cycle and an image during the non-VALID cycle is not utilized as an output image due to the above mentioned reason. But, an image during the non-VALID cycle is a useless image since such image is not used as an output image.

Therefore, in order to avoid generating such useless image, the first shift register 5 and the second shift register 4 are appropriately controlled.

First, conditions for dummy reading out are explained.

Dummy reading is controlled under the following conditions.

a) An accumulation period after completing the idle period (an exposure time)

b) An accumulation period or accumulation cycle after changing a frame rate, when a shutter speed is set in a range from 1H (H means horizontal line, and the same as follows.) to mH.

c) An accumulation period or accumulation cycle after changing a shutter speed, when a shutter speed is set in a range from 1H to mH.

d) An accumulation period or accumulation cycle after changing upper to lower or right to left scanning directions, when a shutter speed is set in a range from 1H to mH.

e) An interlacing frame in the case of a frame rate equal to or less than 7.5 frames/sec. when a shutter speed is set in a range from 1H to mH.

Each of the above conditions is explained referring from FIG. 10 to FIG. 17. FIGS. 10 to FIG. 13 are timing charts of explaining dummy reading out. In the FIG. 10 to FIG. 13, a horizontal axis shows time and each signal varying along with time. Here, it is explained thereafter an example where the number of the sensor cell array 3 is 500H, namely, the number of lines of the sensor cell array 3 including the OB region is 500.

In addition, in the following examples, an accumulation period (exposure time) is defined as an accumulation frame after completing idle, an accumulation frame after a frame rate change in a variable frame or 15 fps, an accumulation frame after a shutter speed change in a variable frame or 15 fps, and an accumulation frame after change of upper to lower or right to left scanning directions in a variable frame or 15 fps.

An accumulation cycle (exposure cycle) is defined as an accumulation frame after a frame rate change in less than or equal to 7.5 fps, an accumulation frame after a shutter speed change in less than or equal to 7.5 fps and an accumulation frame after change of upper to lower or right to left scanning directions in less than or equal to 7.5 fps.

A VALID cycle (Valid Cycle) means a frame for outputting image data, namely the time when the VALID signal is an H level.

An interlacing frame means a frame where image data is not output except the accumulation period (Exposure Time) and the accumulation cycle (Exposure Cycle) in less than or equal to 7.5 fps, namely the time when a VALID signal is an L level.

a) An accumulation period after completing idle (an exposure time)

Figure 10:
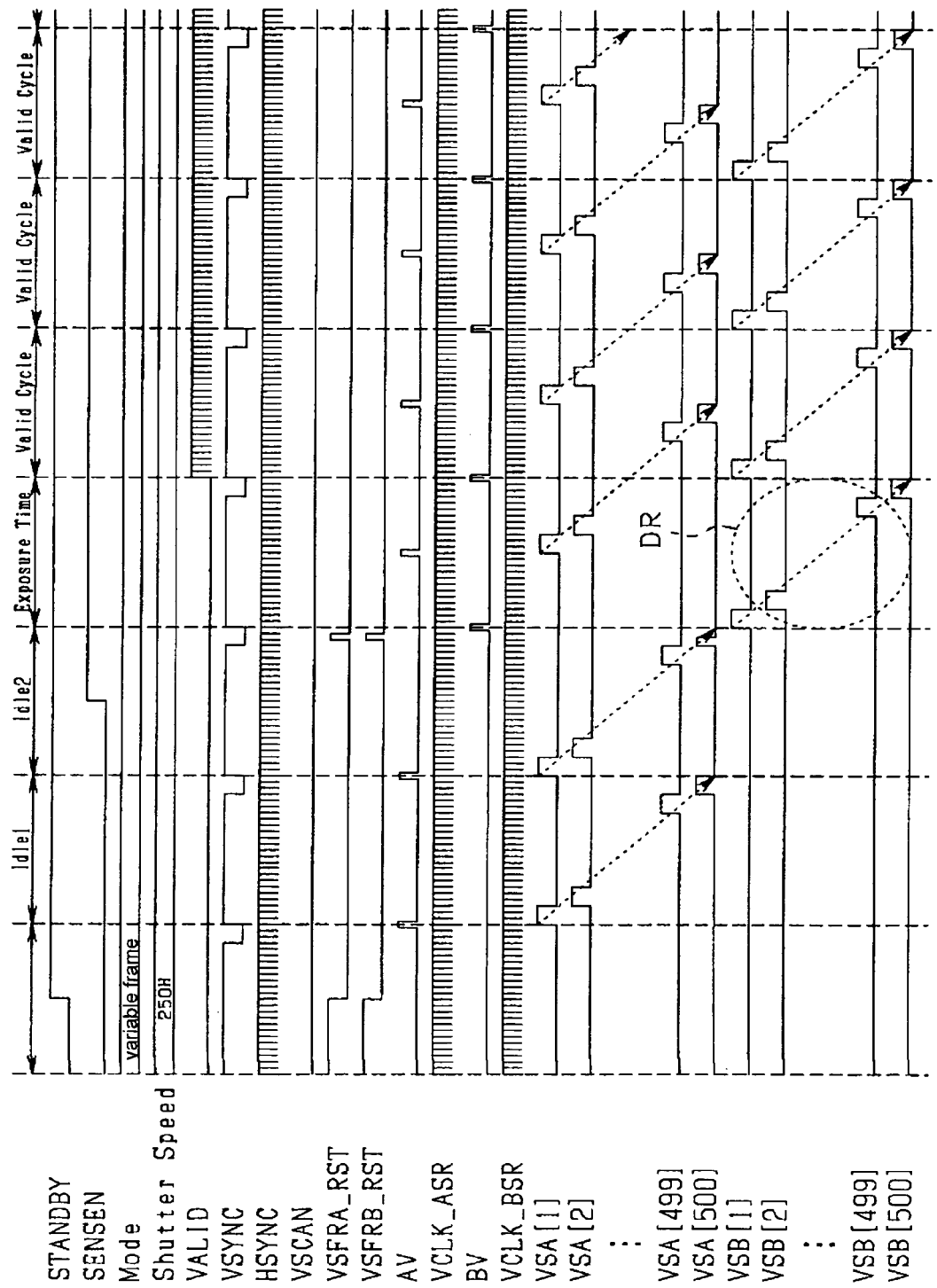
FIG. 10 is a timing chart explaining dummy reading after finishing an idle period.

FIG. 10 is a timing chart that shows dummy reading out during an accumulation period after completion of an idle period.

In FIG. 10, after the STANDBY that is a standby signal is turned from an L level to an H level, the vertical synchronizing signal VSYNC is input and a period becomes a first idle period (Idle1) such that the shift data AV is input to the second shift register 4. Then, the vertical synchronizing signal VSYNC is input successively, and a period becomes a second time idle period (Idle2) such that the shift data AV is input to the second shift register 4. When the shift data AV is input during these idle periods, the selection signal VSA is output subsequently from the second shift register 4 so that a line is selected with a direction (a direction from 1 to m (500) in the figure) designated by a scanning direction designating signal VSCAN.

During the second time idle period (Idle2), when a chip enabling signal SENSEN is turned from an L level to an H level, the image sensor LSI 1 is activated. After being the activated state, data of modes (a variable frame, a fixed frame and others) and shutter speed, namely information regarding setting conditions are read at the timing of initial falling down of the vertical synchronizing signal VSYNC. Then, at the end of the idle period (Idle2), the reset signal VSFRA_RST and the reset signal VSFRB_RST are input to the second shift register 4 and the first shift register 5, respectively, and reset both registers. In FIG. 10, during the idle period (Idle2), a pulse signal of the signal VSA (500) for selecting a line for clearing an image signal falls down in response to rising up of a pulse signal of the reset signal VSFRA_RST, and the second shift register 4 is reset.

In addition, when the reset signal VSFRA_RST and the reset signal VSFRB_RST are input and the second shift register 4 and the first shift register 5 are reset, the second shift register 4 and the first shift register 5 do not output the selection signal VSA and the selection signal VSB, unless the shift data AV and the shift data BV applied to a line for reading an image signal are input to them respectively.

Based on the information regarding input or setting conditions, accumulation operation is executed during the accumulation period (Exposure Time) following the second idle period.

Originally, it is not necessary to input the shift data BV applied to a line for reading an image signal during the accumulation period. But, in order to execute dummy reading out during the accumulation period, the shift data BV applied to a line for reading an image signal is input to the first shift register 5 at the time of starting the accumulation period. Then, the selection signal VSB is output sequentially based on the shift clock signal VCLK_BSR for reading a line out. In FIG. 10, in the range shown as DR of the accumulation period (Exposure Time), dummy reading out is executed, though an image signal is not used as an output image. When dummy reading out is finished, the VALID signal is output at the time of starting the next period.

In FIG. 10, "Mode" indicates a frame rate mode. The frame mode is a variable frame mode in this case. Similarly, "Shutter Speed" indicates a shutter speed. The shutter speed is 250H in this case. Here, the variable frame mode is a mode changing a frame rate depending on shutter speed. A fixed frame mode is a mode that does not change a frame rate even if a shutter speed is changed. Shutter speed is determined by time difference between the shift data AV and the shift data BV applied to a line for reading an image signal.

The scanning direction designating signal VSCAN is a signal indicating a scanning direction in a horizontal direction. In FIG. 10, the scanning direction designating signal VSCAN is an L level such that the scanning direction is from 1 to 500. In addition, when the scanning direction designating signal VSCAN is an H level, the scanning direction is from 500 to 1.

The VCLK_ASR is a shift clock signal of the second shift register 4. The VCLK_BSR is a shift clock signal of the first shift register 5.

When the shift data AV that is an input pulse signal to the second shift register 4 is input, the selection signal VSA is output sequentially from a first line of the second shift register 4. Similarly, when the shift data BV applied to a line for reading an image signal that is an input pulse signal to the first shift register 5 is input, the selection signal VSB is output sequentially from the first shift register 5.

For example, if the number of the lines between a line for reading out an image signal and a line for clearing an image signal that are determined by the data of shutter speed designated via the three line serial interface 15 are 200, namely 200H, the second shift register 4 outputs the signal VSA (1) for selecting a line for clearing an image signal of a first line when the value of a line for reading out an image signal counter (not shown) in the shift data AV becomes 300 during the accumulation period (Exposure Time). When the signal VSA (1) for selecting a line for clearing an image signal is output, the signal VSB (301) for selecting a line for reading out an image signal is output almost simultaneously.

Then, in response to output of the selection signal VSB, the second shift register 4 outputs the selection signal VSA sequentially based on a clock signal of the shift clock signal VCLK_ASR for clearing a line, with keeping the state where the number of lines between line for clearing an image signal and line for reading out an image signal is 250.

As a result, during the clearing period of each H blanking, the number of selected line for clearing an image signal (referred to as selected line number hereafter) by the selection signal VSA and the selection signal VSB becomes the same.

Then, the selection signal VSA and the selection signal VSB are output sequentially thereafter. When the selection signal VSB selects the 500th line, the shift data BV applied to a line for reading an image signal for the next cycle is input to the first shift register 5 and the selection signal VSB is output so that the lines are selected in order from the first line.

The next cycle of an accumulation period becomes a VALID cycle (Valid Cycle). Furthermore, after the VALID cycle, namely after reading the lines from the first line with the selection signal VSB, the selected line number by the selection signal VSA and the selection signal VSB becomes the same such that there is no difference of image quality within a frame.

Therefore, due to dummy reading out during an accumulation period, the next period becomes a VALID cycle period such that a useless image which is not used as an output image is not generated during a cycle following the exposure cycle.

b) An accumulation period or accumulation cycle after changing a frame rate, when a shutter speed is set in a range from 1H to mH.

Figure 11:
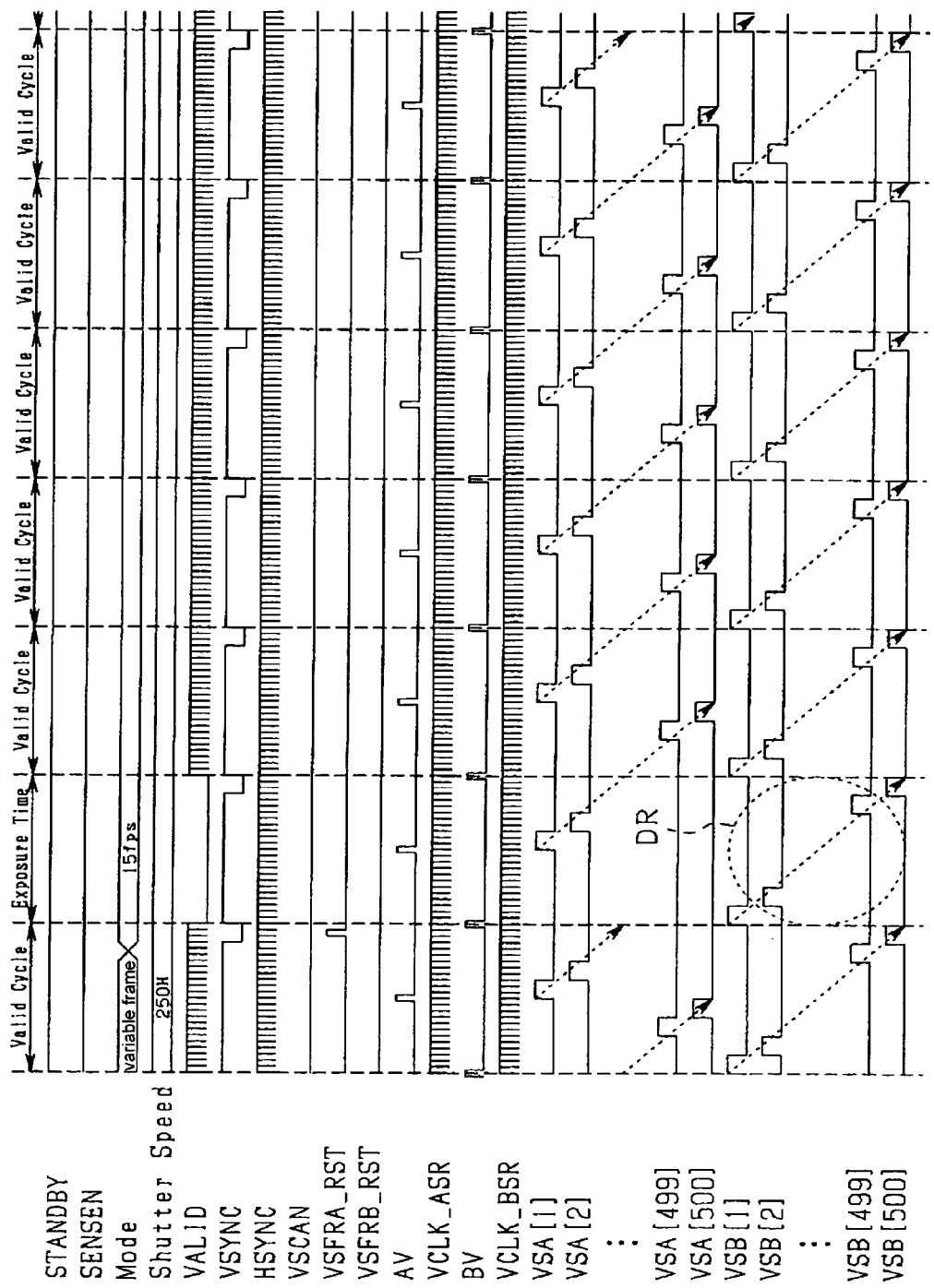
FIG. 11 is a timing chart explaining dummy reading after changing a frame rate.

FIG. 11 is a timing chart that indicates dummy reading out during an accumulation period or accumulation cycle after changing a frame rate when a shutter speed is set in the range from 1H to 500H.

During operation of picking an image up by the image sensor LSI 1, when a mode is changed from a variable frame mode to a fixed frame mode of 15 fps, information of such mode change is read at the timing of falling down of the vertical synchronizing signal VSYNC in a VALID cycle in FIG. 11, so as to execute dummy reading out during the next accumulation period (Exposure Time).

In FIG. 11, at the initial falling down of the vertical synchronizing signal VSYNC, input and setting conditions of modes (a variable frame, fixed frame and others) and shutter speed are read so as to execute accumulation operation during the next accumulation period based on the information.

In addition, in response to the falling down of the vertical synchronizing signal VSYNC, the reset signal VSFRA_RST is output so as to reset the second shift register 4 in order to avoid outputting the selection signal VSA.

In FIG. 11, in response to rising up of a pulse signal of the reset signal VSFRA_RST, a pulse signal (not shown) of the signal VSA (250) for selecting a line for clearing an image signal falls down so as to reset the second shift register 4.

Originally, during the accumulation period, it is not necessary to input the shift data BV applied to a line for reading an image signal, but the shift data BV applied to a line for reading an image signal is input to the first shift register 5 at the start of the accumulation period in order to execute dummy reading out during the accumulation period. Then, the selection signal VSB is output sequentially based on the shift clock signal VCLK_BSR for reading a line out. In FIG. 11, dummy reading out is executed in the range indicated as DR of the accumulation period (Exposure Time), even though an image signal is not used as an output image. When dummy reading out is finished, a VALID signal is output at the start of the next period.

Based on read-out information regarding change, an operation during the accumulation period (Exposure Time) following the VALID cycle is executed such that the shift data AV is output based on the given shutter speed. For example, in this figure, the shutter speed is 250H such that the shift data AV is output at the time when the output of the line for reading out an image signal counter becomes 251, and the signal VSA (1) for selecting a line for clearing an image signal is output. When the g signal VSA (1) for selecting a line for clearing an image signal is output, the signal VSB (251) for selecting a line for reading out an image signal is output almost simultaneously.

Then, in response to the output of the selection signal VSB, the second shift register 4 outputs the selection signal VSA sequentially based on a clock signal of the shift clock signal VCLK_ASR for clearing a line while the number of lines between line for clearing an image signal and line for reading out an image signal are kept to be 250.

As a result, in a clearing period of each H blanking, the number of selected lines that are cleared by the selection signal VSA and the selection signal VSB becomes the same.

Then, during the accumulation period (Exposure Time), the selection signal VSA and the selection signal VSB are output sequentially afterwards. When the selection signal VSB selects the 500th line, the shift data BV applied to a line for reading an image signal is input to the first shift register 5 and the selection signal VSB is output so that the lines are selected in order from the first line.

The next cycle of the accumulation period becomes a VALID cycle (Valid Cycle). Then, after the VALID cycle, namely after reading the lines from the first line by the selection signal VSB, all the selected line numbers by the selection signal VSA and the selection signal VSB become the same such that there is no difference of image quality within one frame.

Therefore, the next period becomes the VALID cycle period by dummy reading out during the accumulation period such that a useless image which is not used as the output image is not generated during the cycle following an accumulation cycle after changing a frame rate.

c) An accumulation period or accumulation cycle after changing a shutter speed, when a shutter speed is set in a range from 1H to mH.

Figure 12:
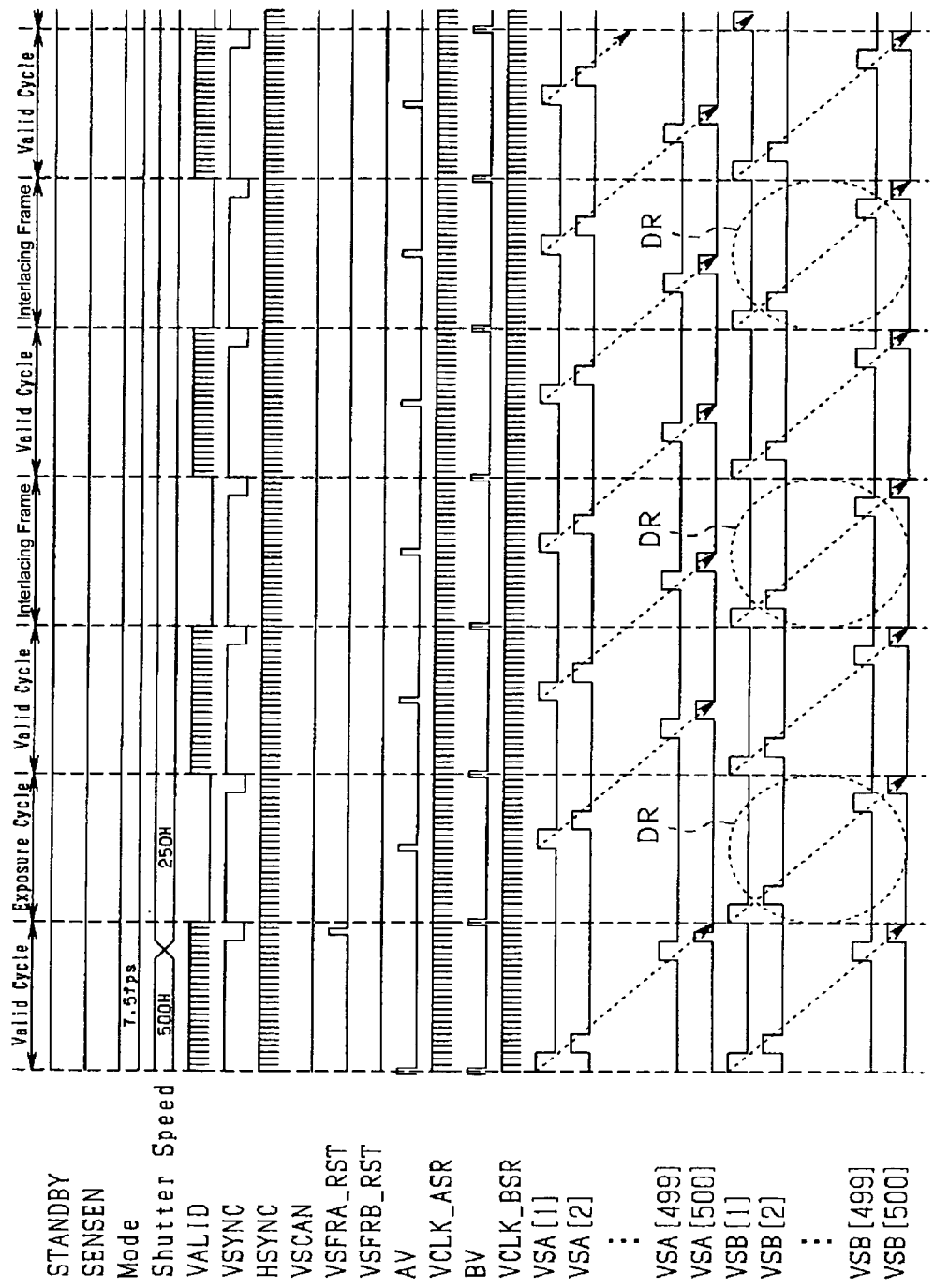
FIG. 12 is a timing chart explaining dummy reading after changing a shutter speed.

FIG. 12 is a timing chart indicating dummy reading out during the accumulation period or accumulation cycle after changing a shutter speed, when a shutter speed is set in a range from 1H to mH.

As shown in FIG. 12, during the operation of picking an image up by the image sensor LSI 1, if a shutter speed is changed from 500H to 250H for example, the information of such shutter speed change is read at the timing of falling down of the vertical synchronizing signal VSYNC. Then, dummy reading out is executed during the next accumulation period (Exposure Time) based on such read information of the change.

In FIG. 12, at the initial falling down of the vertical synchronizing signal VSYNC, inputs or setting conditions of modes (a variable frame, fixed frame and others) and a shutter speed are read so as to execute the accumulation operation during the next accumulation period based on the information.

As shown in FIG. 12, when a shutter speed is changed from 500H to 250H, the change information of the shutter speed after the change is read at the timing of falling down of the vertical synchronizing signal VSYNC after the change. The VSFRA_RST is output in response to the falling down of the vertical synchronizing signal VSYNC so as to reset the second shift register 4 in order to avoid outputting the selection signal VSA. In FIG. 12, in response to a rising up of a pulsed signal of the reset signal VSFRA_RST, a pulse signal of the signal VSA (500) for selecting a line for clearing an image signal falls down so as to reset the second shift register 4.

Originally, during the accumulation period, it is not necessary to input the shift data BV applied to a line for reading an image signal, but the shift data BV applied to a line for reading an image signal is input to the first shift register 5 at the start of the accumulation period in order to execute dummy reading out during the accumulation period. Then, the selection signal VSB is output sequentially based on the shift clock signal VCLK_BSR for reading a line out. In FIG. 12, dummy reading out is executed in the range indicated as DR of the accumulation period (Exposure Time), even though an image signal is not used as an output image. When dummy reading out is finished, a VALID signal is output at the start of the next period.

Based on the read information of the change, the operation of the accumulation period (Exposure Cycle) following the VALID cycle is executed so as to output the shift data AV based on the changed shutter speed. For example, the shutter speed is 250H in FIG. 12 such that the shift data AV is output when the output of the line for reading out an image signal counter becomes 251.

As a result, in a clearing period of each H blanking, the number of selected line for clearing an image signal by the selection signal VSA and by the selection signal VSB becomes the same.

Then, during the accumulation period (Exposure Time), the selection signal VSA and the selection signal VSB are output sequentially afterwards. When the selection signal VSB selects the 500th line, the shift data BV applied to a line for reading an image signal is input to the first shift register 5 and the selection signal VSB is output so that the lines are selected in order from the first line.

The next cycle of the accumulation period becomes a VALID cycle (Valid Cycle). Then, after the VALID cycle, namely after reading the lines from the first line by the selection signal VSB, all the selected line numbers by the selection signal VSA and the selection signal VSB become the same such that there is no difference of image quality within one frame.

Then, in the example of FIG. 12, a mode is a fixed mode of 7.5 frames per second such that a frame following a VALID cycle becomes an interlacing frame. Thus, one time of reading out is executed every two frames, namely one time of interlacing is executed every two frames. Dummy reading is also executed during an interlacing frame. The VALID signal is not output during this interlacing frame.

Originally, during the interlacing frame period, it is not necessary to input the shift data BV applied to a line for reading an image signal, but the shift data BV applied to a line for reading an image signal is output at the start of the interlacing frame period in order to execute dummy reading out during the interlacing frame period. Then, the selection signal VSB is output sequentially based on the shift clock signal VCLK_BSR for reading a line out. After completing dummy reading out, a VALID signal is output at the start of the next period.

Thus, the interlacing frame and the VALID cycle are repeated alternatively. Dummy reading out is executed during the interlacing frame such that the selected line number becomes the same. Therefore, there is no difference of image quality within one frame.

Therefore, the next period becomes the VALID cycle period by executing dummy reading out during the accumulation period such that a useless image which is not used as the output image is not generated during the cycle following an accumulation cycle after changing a frame rate.

d) An accumulation period or accumulation cycle after changing upper to lower or right to left scanning directions, when a shutter speed is set in a range from 1H to mH.

Figure 13:
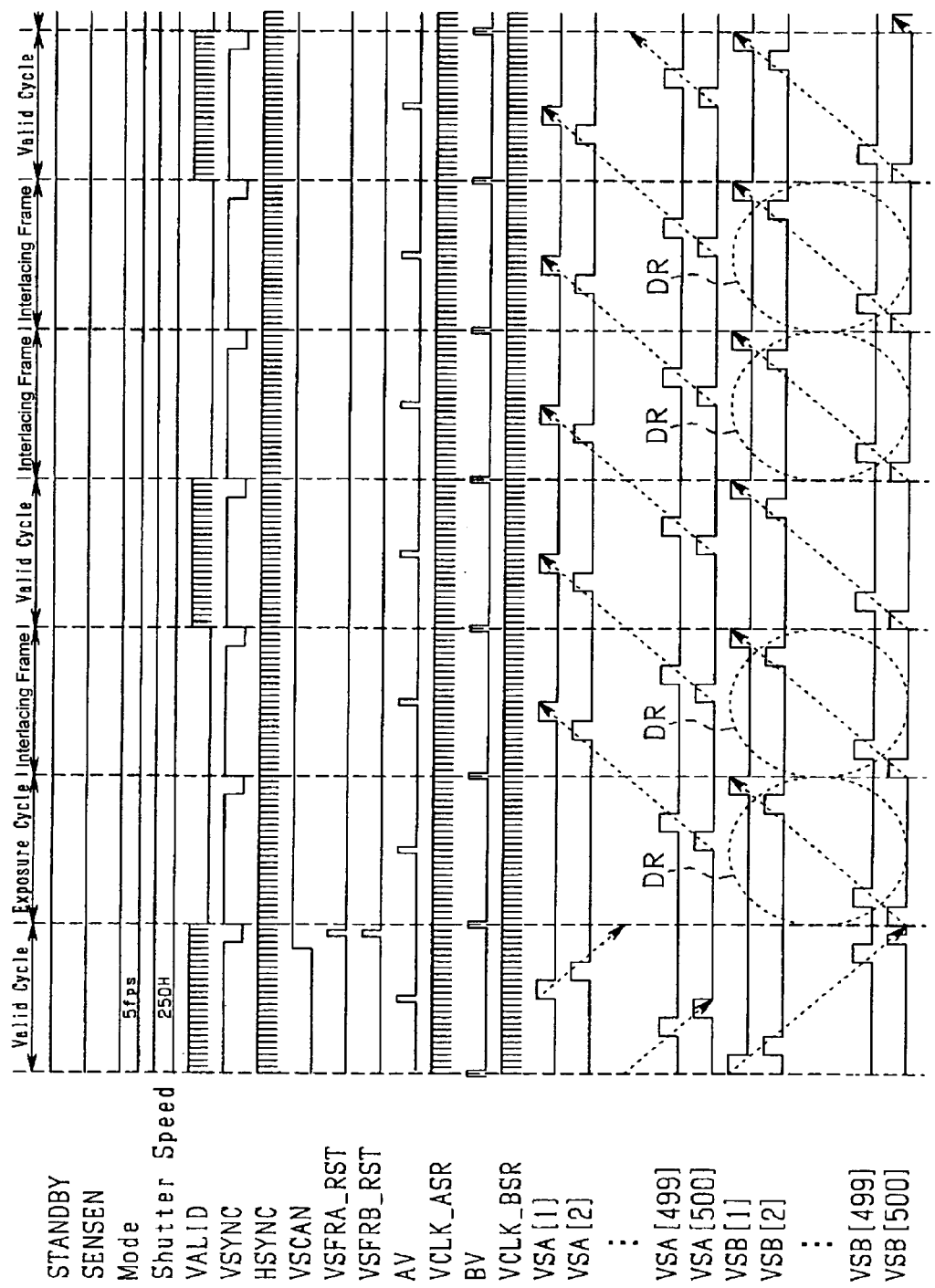
FIG. 13 is a timing chart explaining dummy reading after changing upper to lower or right to left scanning directions.

FIG. 13 is a timing chart indicating dummy reading out during the accumulation period or accumulation cycle after changing upper to lower or right to left scanning directions, when a shutter speed is set in a range from 1H to 500H.

As shown in FIG. 13, during the operation of picking an image up by the image sensor LSI 1, if the scanning direction is changed, such information is read at the timing of falling down of the vertical synchronizing signal VSYNC. Then, dummy reading out is executed during the next accumulation period (Exposure Time).

Here, the scanning direction is explained as the example of changing in vertical direction. But, dummy reading out that will be explained in the following can be also applied to the case of changing horizontal direction, namely changing in right to left direction.

As shown in FIG. 13, since a mode is a fixed mode of 5 frames per second and a shutter speed is 250H, if the scanning direction indicating signal VSCAN is changed from an L level to an H level, the information of such change of a scanning direction is read at the timing of falling down of the vertical synchronizing signal VSYNC after the change. During the VALID cycle, in response to the falling down of the vertical synchronizing signal VSYNC, the reset signal VSFRA_RST and the reset signal VSFRB_RST are output so as to reset the second shift register 4 and the first shift register 5 in order to avoid outputting the selection signal VSA and the selection signal VSB.

In FIG. 13, in response to rising up of a pulse signal of the reset signal VSFRA_RST, a pulse signal (not shown) of the signal VSA (250) for selecting a line for clearing an image signal falls down so as to reset the second shift register 4. Further, in response to rising up of a pulse signal of the reset signal VSFRB_RST applied to shift register connected to a line for reading out an image signal, a pulse signal of the signal VSB (500) for selecting a line for reading out an image signal falls down so as to reset the first shift register 5.

Originally, during the accumulation period, it is not necessary to input the shift data BV applied to a line for reading an image signal, but the shift data BV applied to a line for reading an image signal is input to the first shift register 5 at the start of the accumulation period in order to execute dummy reading out during the accumulation period. Then, the selection signal VSB is output sequentially based on the shift clock signal VCLK_BSR for reading a line out.

In FIG. 13, dummy reading out is executed in the range indicated as DR of the accumulation period (Exposure Time), even though an image signal is not used as an output image.

Based on read out information regarding change of a scanning direction, an accumulation operation during the next accumulation period (Exposure Time) after the change of the scanning direction is executed such that the shift data AV is output based on the given shutter speed. For example, since a shutter speed is 250H in FIG. 13, the shift data AV is output when the output of the line for reading out an image signal counter becomes 251.

As a result, in a clearing period of each H blanking, the number of selected line for clearing an image signal by the selection signal VSA and the selection signal VSB becomes the same.

Then, the selection signal VSA and the selection signal VSB are output sequentially afterwards. When the selection signal VSB selects the last line, the shift data BV applied to a line for reading an image signal is input to the first shift register 5 and the selection signal VSB is output so as to select the lines from the 500th line.

Further, in an example of FIG. 13, a mode is a fixed mode of 5 frames per second and a frame following an accumulation period (Exposure Cycle) becomes an interlacing frame.

Originally, during the interlacing frame period, it is not necessary to input the shift data BV applied to a line for reading an image signal, but the shift data BV applied to a line for reading an image signal is output at the start of the interlacing frame period in order to execute dummy reading out during the interlacing frame period. Then, the selection signal VSB is output sequentially based on the shift clock signal VCLK_BSR for reading a line out. The VALID signal is not output during an interlacing frame. When dummy reading out during an interlacing frame period is finished, the VALID signal is output at the start of the next period.

After the VALID cycle when such VALID signal is output, two times of interlacing frames and one time of VALID cycle are repeated alternatively.

During an interlacing frame, one time of reading out is executed every three frames, namely one time of interlacing is executed every three frames.

As a result, dummy reading out is executed during two times of interlacing frames and the selected line number becomes the same such that there is no difference of image quality within one frame.

Therefore, dummy reading out is executed during an accumulation period after the change of a scanning direction such that the next period becomes the VALID cycle period. Thus, a useless image that is not used as an output image is not generated during the cycle following the accumulation period after the change of scanning direction.

e) An interlacing frame in the case of the frame rate equal to or less than 7.5 frames/sec, when a shutter speed is set in a range from 1H to mH.

Dummy reading out during an interlacing frame in the case of the frame rate equal to or less than 7.5 frames/sec, when a shutter speed is set in a range from 1H to 500H, is explained referring to FIG. 12 and 13.

As shown in FIG. 12, during the operation of picking an image up by the image sensor LSI 1, if a shutter speed is changed from 500H to 250H for example, the information of such shutter speed change is read at the timing of falling down of the vertical synchronizing signal VSYNC. Then, dummy reading out is executed during the next accumulation period (Exposure Time). Furthermore, in FIG. 12, as described above, a mode is a fixed mode of 7.5 frames per second such that one time of reading out every two frames, namely one time of interlacing per two frames is executed. Thus, dummy reading out is executed during an interlacing frame.

In addition, in FIG. 13, when a scanning direction is changed, such information is read at the timing of falling down of the synchronizing signal VSYNC so as to execute dummy reading out during the next accumulation period. Furthermore, in FIG. 13, as described above, a mode is a mode of 5 frames per second such that one time of reading out every three frames is executed. After the first accumulation period, there are one time interlacing frame and VALID frame. Thereafter, two times interlacing are executed every three frames. Meanwhile, dummy reading out is executed during such interlacing frame.

Originally, during the interlacing frame period, it is not necessary to input the shift data BV applied to a line for reading an image signal, but the shift data BV applied to a line for reading an image signal is input to the first shift register 5 at the start of the interlacing frame period in order to execute dummy reading out during the interlacing frame period. Then, the selection signal VSB is output sequentially based on the shift clock signal VCLK_BSR for reading a line out. In FIG. 12 and 13, dummy reading out is executed in the range indicated as DR of the interlacing period, even though an image signal is not used as an output image. When dummy reading out is finished, the VALID signal is output at the start of the next period.

As the described above, dummy reading out is execute during the interlacing frame and the selected line number becomes the same such that there is no difference of image quality within one frame.

Therefore, the next period becomes the VALID cycle period by executing dummy reading out during the interlacing frame period such that a useless image that is not used as the output image is not generated during the cycle following an interlacing frame.

Next, inhibition of dummy reading out is explained.

Figure 14:
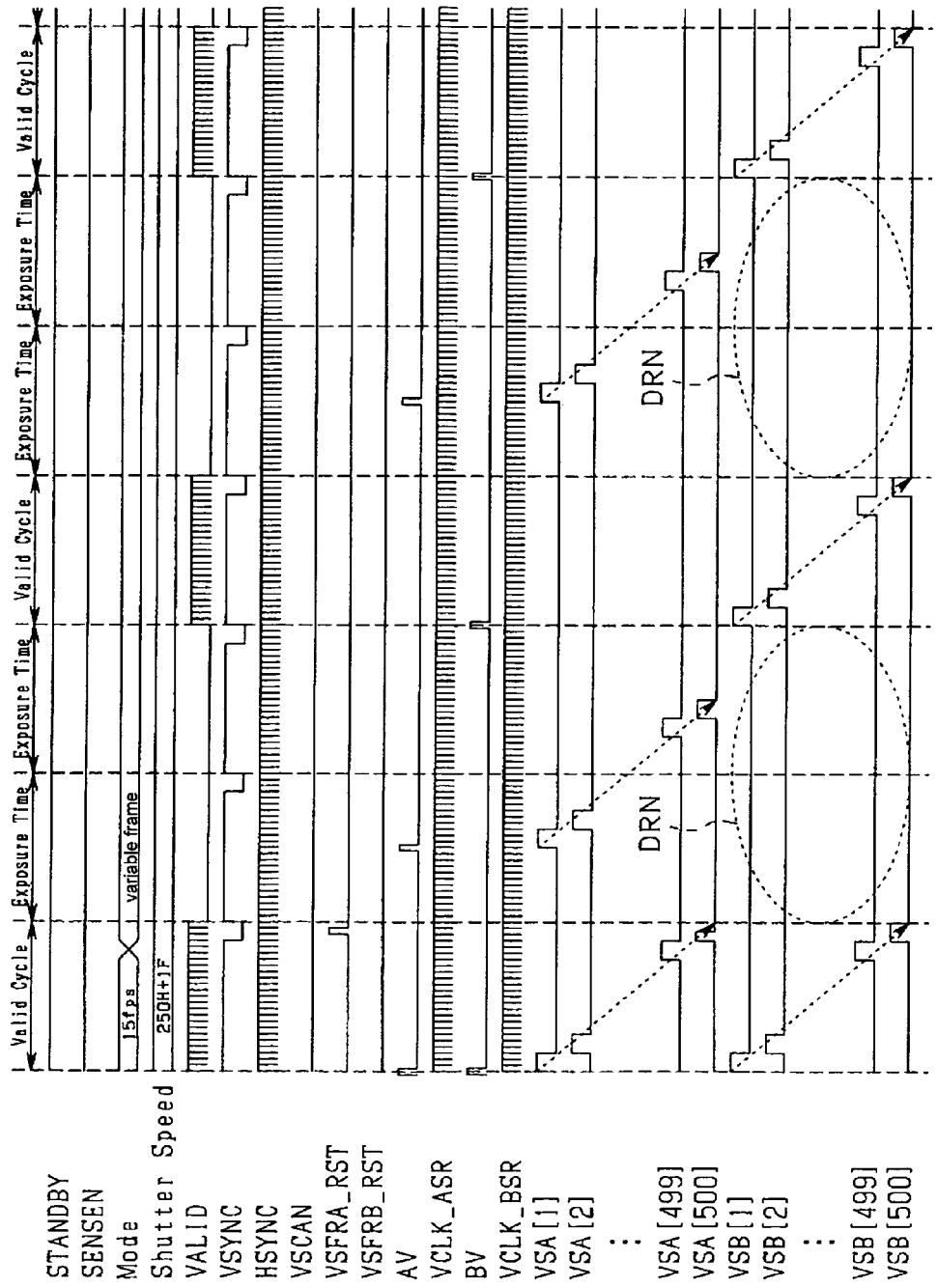
FIG. 14 is a timing chart explaining inhibition of dummy reading after changing a frame rate.
Figure 15:
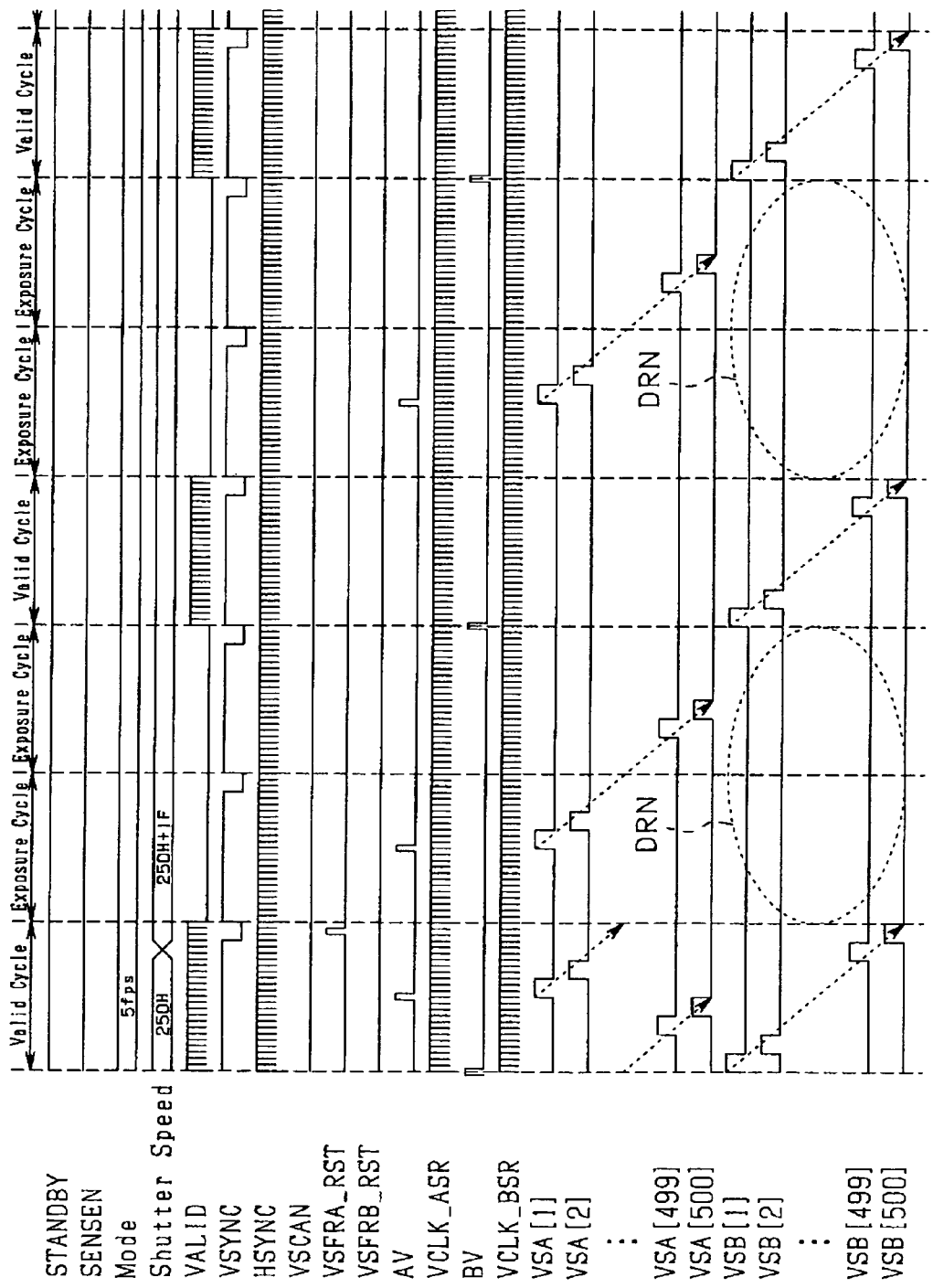
FIG. 15 is a timing chart explaining inhibition of dummy reading after changing a shutter speed.

As described above, in the case of predetermined conditions, dummy reading out is executed during an accumulation period, accumulation cycle and an interlacing frame such that the selected line number in each blanking for each cycle becomes the same. However, in the case when a shutter speed exceeds a 1 frame (a frame may be abbreviated as F thereafter), namely it is set as equal to or more than (1 frame+1H) and meets the following conditions, control of inhibiting dummy reading out is executed.

f) An accumulation period or accumulation cycle after changing a frame rate, when a shutter speed exceeds 1 frame, namely when a shutter speed is set equal to or more than (1 frame+1H) (FIG. 14).

g) An accumulation period or accumulation cycle after changing a shutter speed, when a shutter speed exceeds 1 frame, namely when a shutter speed is set equal to or more than (1 frame+1H) (FIG. 15).

h) An accumulation period or accumulation cycle after changing an upper to lower or right to left scanning directions, when a shutter speed exceeds 1 frame, namely when a shutter speed is set equal to or more than (1 frame+1H) (FIG. 14).

Figure 16:
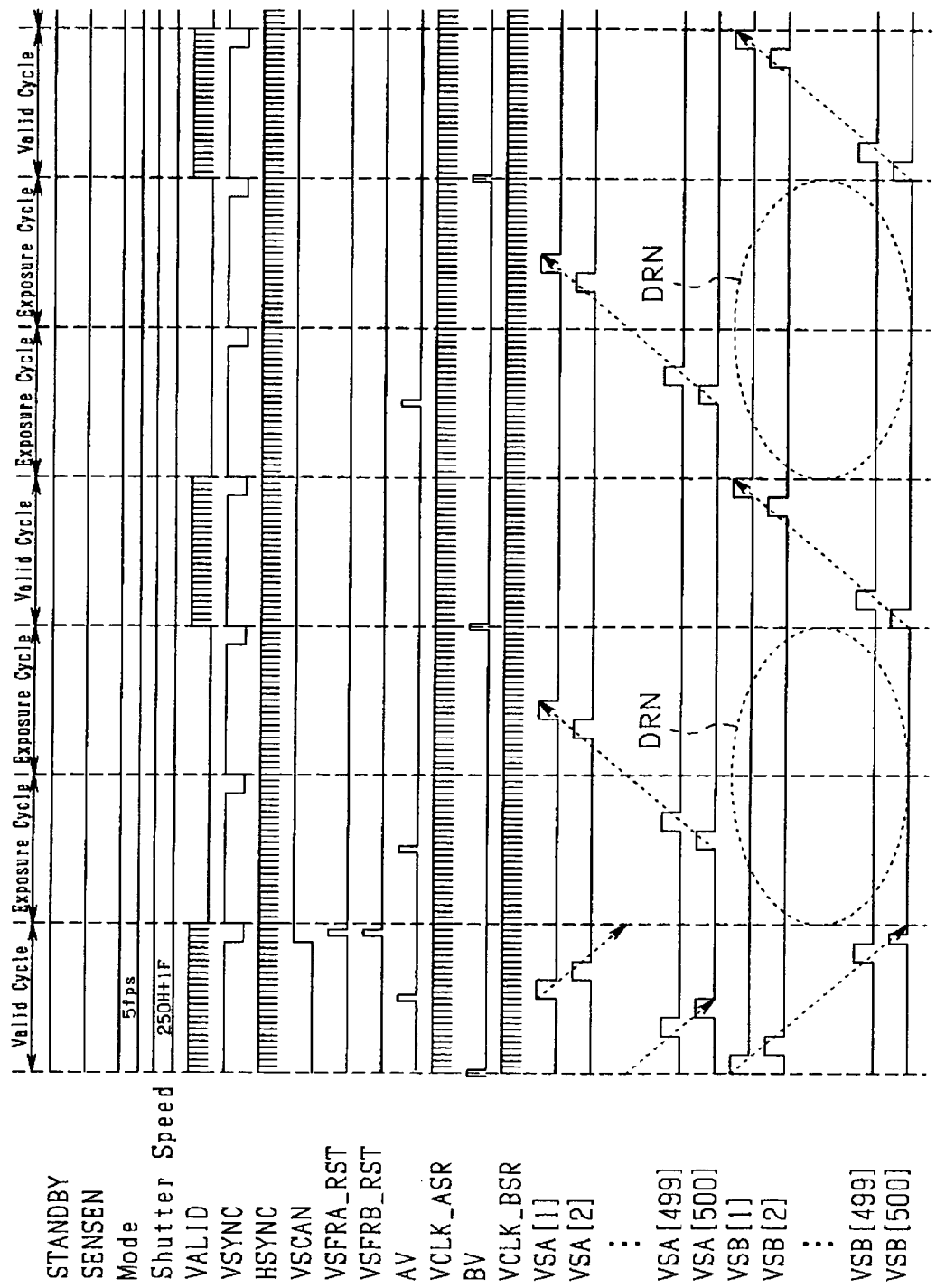
FIG. 16 is a timing chart explaining inhibition of dummy reading after changing upper to lower or right to left scanning directions.

Here, a shutter speed is (250 H+1F) in FIG. 14 to FIG. 16.

FIG. 14 is a timing chart for explaining the case of inhibiting dummy reading out during the accumulation period or accumulation cycle after changing a frame rate, when a shutter speed exceeds 1 frame, namely when a shutter speed is set equal to or more than (1 frame+1H).

FIG. 15 is a timing chart for explaining the case of inhibiting dummy reading out during the accumulation period or accumulation cycle after changing a shutter speed, when a shutter speed exceeds 1 frame, namely when a shutter speed is set equal to or more than (1 frame+1 H).

FIG. 16 is a timing chart for explaining the case of inhibiting dummy reading out during the accumulation period or accumulation cycle after changing upper to lower or right to left scanning directions, when a shutter speed exceeds 1 frame, namely when a shutter speed is set equal to or more than (1 frame+1H).

As shown in FIG. 14 to FIG. 16, in the case when a shutter speed exceeds 1 frame, if a frame rate is changed, or a shutter speed is changed, or a scanning direction is changed during the VALID cycle, dummy reading out is inhibited in an accumulation period following the VALID cycle. Inhibiting dummy reading out means inhibiting outputting the shift data BV applied to a line for reading an image signal to the first shift register 5 in detail. In other words, inhibiting dummy reading out means that the shift data BV applied to a line for reading an image signal is not input to the first shift register 5.

In other words, when a frame rate or others is changed during a certain VALID cycle, the reset signal VSFRA_RST is input to the second shift register 4 at the predetermined timing. Then, during two cycles when the shift data AV is output and the selection signal VSA is output in an accumulation period, since two cycles accumulation periods are needed, the shift data BV for reading out is not output. Instead, the shift data BV applied to a line for reading an image signal is output and charges are read at the time of starting the VALID period after completing this two accumulation periods. After passing the VALID period, two accumulation periods are continued. In this two accumulation periods, the shift data BV is not output during the two cycles when the shift data AV is output and the selection signal VSA is output. The shift data BV is output and charges are read at the time of starting the VALID period after completing this two accumulation periods. The similar operation is repeated afterwards.

In particular, in FIG. 16, in the case of where shutter speed exceeds 1 frame, when a scanning direction is changed, the reset signal VSFRB_RST is input to the first shift register 5 with the predetermined timing. In addition, as described above, the predetermined timing when the reset signal VSFRA_RST and the reset signal VSFRB_RST are input to the second shift register 4 and the first shift register 5 respectively, is after passing an H blanking period for example.

Thus, in the case when a shutter speed exceeds 1 frame, dummy reading out is not executed during a period of DRN in FIG. 14 to FIG. 16 since the shift data BV applied to a line for reading an image signal is not output at the time of starting each accumulation period. In FIG. 14 to FIG. 16, in response to the falling down of a pulse signal of the reset signal VSFRA_RST, a pulse signal of the selection signal VSA falls down such that the second shift register 4 is reset. Further, in response to the rising up of a pulse signal of the reset signal VSFRB_RST, the selection signal VSB falls down such that the first shift register 5 is reset.

Figure 17:
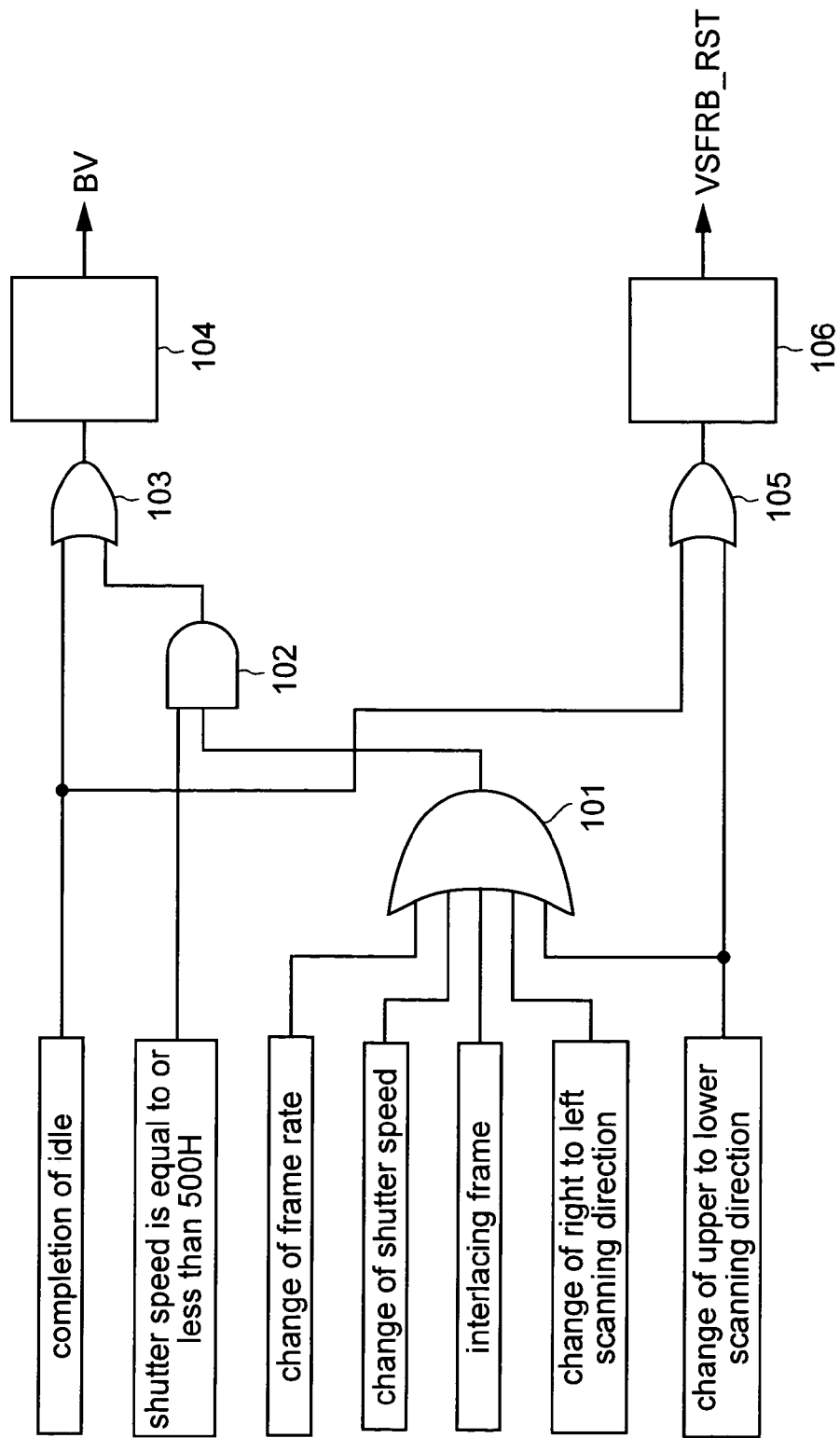
FIG. 17 is a circuit diagram for controlling dummy reading out.

The above-mentioned dummy reading out and its inhibition are realized by a circuit shown in FIG. 17. FIG. 17 shows a controlling circuit for dummy reading out. This control circuit includes a first OR circuit 101. If any of a frame rate, a shutter speed, right to left scanning direction, and upper to lower scanning direction is changed or an interlacing frame is generated, the first OR circuit 101 receives a signal indicating such change. The control circuit further includes an AND circuit 102 that receives the output from the OR circuit 101 and a signal indicating a state where a shutter speed is equal to or less than mH, namely 500H in the above example. The control circuit further includes a second OR circuit 103 that receives the output from the AND circuit 102 and a signal indicating completion of idle and a first output circuit 104 that receives the output from the second OR circuit 103. The control circuit further includes a third OR circuit 105 that receives a signal indicating completion of idle and a signal indicating change of a upper to lower scanning direction and a second output circuit 106 that receives the output from the third OR circuit 105. Thus, the control circuit can realize dummy reading out and processing its inhibition.

In the above mentioned a), a signal is input into the second OR circuit 103 at the time of finishing idle state. Furthermore, when a shutter speed is equal to or less than 500H, which is one of the conditions from the above b) to e), a signal indicating that the shutter speed is equal to or less than 500H is input to the one of input terminal of the AND circuit 102. In addition, when another of the conditions from the above b) to e) such as change of a frame rate, change of a shutter speed, generation of an interlacing frame, change of an upper to lower scanning direction or change of a right to left scanning direction occurs, signals showing these changes are input to the OR circuit 101 and the OR circuit outputs the output signal to one terminal of the AND circuit 102. The other terminal of the AND circuit 102 receives a signal such that the AND circuit 102 receives two input signals and outputs the output signal to the OR circuit 103.

Therefore, a signal of the shift data BV is output from the output circuit 104 under the conditions from a) to e) by the above-mentioned predetermined timing.

In addition, when a shutter speed exceeds mH, namely 500H in the above example, one of input terminal of the AND circuit 102 does not receive a signal so as not to output an output signal from the AND circuit 102. Therefore, dummy reading out is inhibited in the conditions from h) to f).

Furthermore, if the upper to lower scanning direction is changed or idle is completed, the output signal from the third OR circuit 105 that shows the change or the condition is input to the output circuit 106 so as to output the reset signal VSFRB_RST applied to shift register connected to a line for reading out an image signal from the output circuit 106 at the above mentioned timing.

Therefore, inhibition of dummy reading out is executed so as not to generate a useless image. Thus, an image output from a solid-state image-pickup element can be surely obtained without any delay.

In addition, the circuit shown in FIG. 17 is installed in the TG 13. However, as described above, if the design system by using HDL is applied, another circuit structure can be realized.

In addition, in the above-preferred embodiments, a MOS type image sensor of threshold voltage modulation system was explained as a solid-state image-pickup element. However, the present invention is not limited to a MOS type image sensor of threshold voltage modulation system, but can be applied to an image sensor of other systems.

What is claimed is:

1. An image processing device that reads an image signal from a solid-state image-pickup element where a plurality of unit pixels including a transistor for detecting a light signal and a photo diode are arranged in a matrix, the device comprising:
    a first shift register connected to a line of the matrix for reading out an image signal, the first shift register selecting a line where a signal in response to carriers accumulated in an accumulation state for generating carriers in the photo diode in response to received light is read out;
    a second shift register connected to a line for clearing an image signal, the second shift register selecting a line for clearing an image signal where residual carriers in the solid-state image-pickup element are discharged from the solid-state image-pickup element; and
    an output circuit that outputs shift data applied to the line for reading out an image signal, based on which selection signal for selecting the line for reading out an image signal is output, to the first shift register, when a number of lines between the line for reading out an image signal and the line for clearing an image signal is equal to or less than a total number of lines in the matrix and a condition for picking an image up is changed, and further the output circuit inhibiting the output of the shift data to the first shift register, when the number of lines between the line for reading out an image signal and the line for clearing an image signal is more than the total number of lines in the matrix and the condition for picking an image up is changed.

2. The image processing device according to claim 1, further comprising:
    another output circuit that outputs a reset signal to the second shift register.

3. The image processing device according to claim 1, wherein the condition for picking an image up further comprises at least on of a frame rate, a shutter speed and a scanning direction.

4. The image processing device according to claim 1, wherein the output circuit outputs the selection signal when generating an interlacing frame according to frame rate.

5. An image processing method of reading an image signal from a solid-state image-pickup element where a plurality of unit pixels including a transistor for detecting a light signal and a photo diode are arranged in a matrix, the method comprising:
    forming a first shift register connected to a line of the matrix for reading out an image signal, the first shift register selecting a line where a signal in response to carriers accumulated in an accumulation state for generating carriers in the photo diode in response to received light is read out;
    forming a second shift register connected to a line for clearing an image signal, the second shift register selecting a line for clearing an image signal where residual carriers in the solid-state image-pickup element are discharged from the solid-state image-pickup element; and
    outputting shift data applied to the line for reading out an image signal, based on which selection signal for selecting the line for reading out an image signal is output, to the first shift register, when a number of lines between the line for reading out an image signal and the line for clearing an image signal is equal to or less than a total number of lines in the matrix and a condition for picking an image up is changed; and
    inhibiting the output of the shift data to the first shift register, when the number of lines between the line for reading out an image signal and the line for clearing an image signal is more than the total number of lines in the matrix and the condition for picking an image up is changed.

6. A solid-state image-pickup device, comprising:
    a solid-state image-pickup element where a plurality of unit pixels including a transistor for detecting a light signal and a photo diode are arranged in a matrix;
    a first shift register connected to a line of the matrix for reading out an image signal, the first shift register selecting a line where a signal in response to carriers accumulated in an accumulation state for generating carriers in the photo diode in response to received light is read out;
    a second shift register connected to a line for clearing an image signal, the second shift register selecting a line for clearing an image signal where residual carriers in the solid-state image-pickup element are discharged from the solid-state image-pickup element; and
    an output circuit that outputs shift data applied to the line for reading out an image signal, based on which selection signal for selecting a line for reading out an image signal is output, to the first shift register, when a number of lines between the line for reading out an image signal and the line for clearing an image signal is equal to or less than a total number of lines in the matrix and a condition for picking an image up is changed, and further the output circuit inhibiting the output of the shift data to the first shift register, when the number of lines between the line for reading out an image signal and the line for clearing an image signal is more than the total number of lines in the matrix and the condition for picking an image up is changed.

* * * * *